(12) United States Patent
Ishikawa

(10) Patent No.: US 10,953,475 B2
(45) Date of Patent: Mar. 23, 2021

(54) CHIP/DUST PREVENTION COVER, CHIP/DUST PREVENTION COVER SET, CHUCK MECHANISM, AND MACHINE TOOL

(71) Applicant: Synthe Tech Inc., Kashiwa (JP)

(72) Inventor: Yoshiaki Ishikawa, Kashiwa (JP)

(73) Assignee: SYNTHE TECH INC., Kashiwa (JP)

( * ) Notice: Subject to any disclaimer, the term of this patent is extended or adjusted under 35 U.S.C. 154(b) by 0 days.

(21) Appl. No.: 16/309,358

(22) PCT Filed: Nov. 15, 2017

(86) PCT No.: PCT/JP2017/041069
§ 371 (c)(1),
(2) Date: Dec. 12, 2018

(87) PCT Pub. No.: WO2018/092797
PCT Pub. Date: May 24, 2018

(65) Prior Publication Data
US 2019/0329325 A1   Oct. 31, 2019

(30) Foreign Application Priority Data

Nov. 15, 2016   (JP) .............................. JP2016-222648

(51) Int. Cl.
*B23B 31/00*   (2006.01)
*B23Q 11/00*   (2006.01)

(52) U.S. Cl.
CPC ........ *B23B 31/001* (2013.01); *B23B 2231/28* (2013.01); *B23Q 11/005* (2013.01)

(58) Field of Classification Search
CPC ... B23B 31/001; B23B 31/00; B23B 2231/28; B23Q 11/08; B23Q 11/005; Y10T 279/3493
See application file for complete search history.

(56) References Cited

U.S. PATENT DOCUMENTS 2,538,521 A * 1/1951 Huntting ............... B23B 31/001
                                                              279/116
2,903,268 A * 9/1959 Buck ....................... B23B 31/36
                                                              279/123
(Continued)

FOREIGN PATENT DOCUMENTS

DE   10 2005 062402      6/2007
EP      0 674 960       10/1995
(Continued)

OTHER PUBLICATIONS

Extended European Search Report dated Feb. 5, 2020 issued in European Patent Application No. 17871314.5, 8 pp.
(Continued)

*Primary Examiner* — Eric A. Gates
*Assistant Examiner* — Paul M Janeski
(74) *Attorney, Agent, or Firm* — Nixon & Vanderhye P.C.

(57) ABSTRACT

Intrusion of chips is prevent into gaps formed between inner end surfaces of master jaws and a chuck cover. A top plate is disposed at the center of an end surface of a chuck body. Top covers, which move in conjunction with movements of master jaws when opening and closing the chuck, are disposed in top cover guide recesses formed at three positions on the top plate. Each top cover abuts the center-side end parts of serrated surfaces formed on both widthwise sides of a respective master jaw and the center-side end part of a step section of a stepped claw therebetween, and the top covers close gaps formed at the center-side end parts by the movements of the master jaws at all times by moving in conjunction with movement of the master jaws.

9 Claims, 19 Drawing Sheets

(56) References Cited

U.S. PATENT DOCUMENTS

| | | | | |
|---|---|---|---|---|
| 2,905,477 A | * | 9/1959 | Buck | B23B 31/36 |
| | | | | 279/123 |
| 3,096,098 A | * | 7/1963 | Buck | B23B 31/16283 |
| | | | | 279/123 |
| 3,904,214 A | * | 9/1975 | Manchester | B23B 31/16291 |
| | | | | 279/4.11 |
| 4,504,070 A | * | 3/1985 | Norton | B23B 31/001 |
| | | | | 279/121 |
| 4,553,765 A | * | 11/1985 | Negoro | B23B 31/001 |
| | | | | 279/157 |
| 5,580,197 A | | 12/1996 | Rohm | |
| 5,590,985 A | | 1/1997 | Mack | |
| 6,073,940 A | * | 6/2000 | Tabachenko | B23B 31/001 |
| | | | | 279/110 |
| 2005/0067797 A1 | * | 3/2005 | Onyszkiewicz | B23B 31/16266 |
| | | | | 279/121 |
| 2007/0145693 A1 | | 6/2007 | Mack | |

FOREIGN PATENT DOCUMENTS

| | | | | |
|---|---|---|---|---|
| EP | 3363569 A1 | * | 8/2018 | B65D 59/00 |
| JP | 47-9184 | | 4/1972 | |
| JP | 4-136603 | | 12/1992 | |
| JP | 2001-277012 | | 10/2001 | |
| JP | 4273218 | | 3/2009 | |
| JP | 6233827 | | 11/2017 | |

OTHER PUBLICATIONS

International Search Report dated Dec. 26, 2017 issued in PCT International Patent Application No. PCT/JP2017/041069 and English translation, 6 pp.

\* cited by examiner

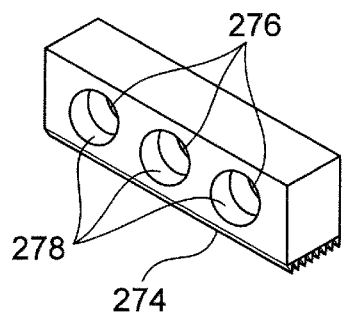
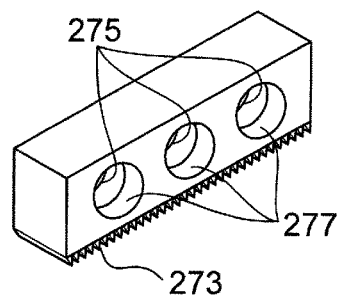
FIG. 5C  FIG. 5A
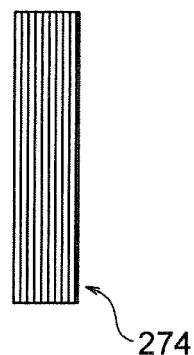
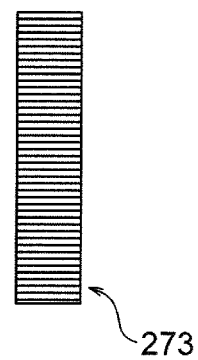
FIG. 5D  FIG. 5B

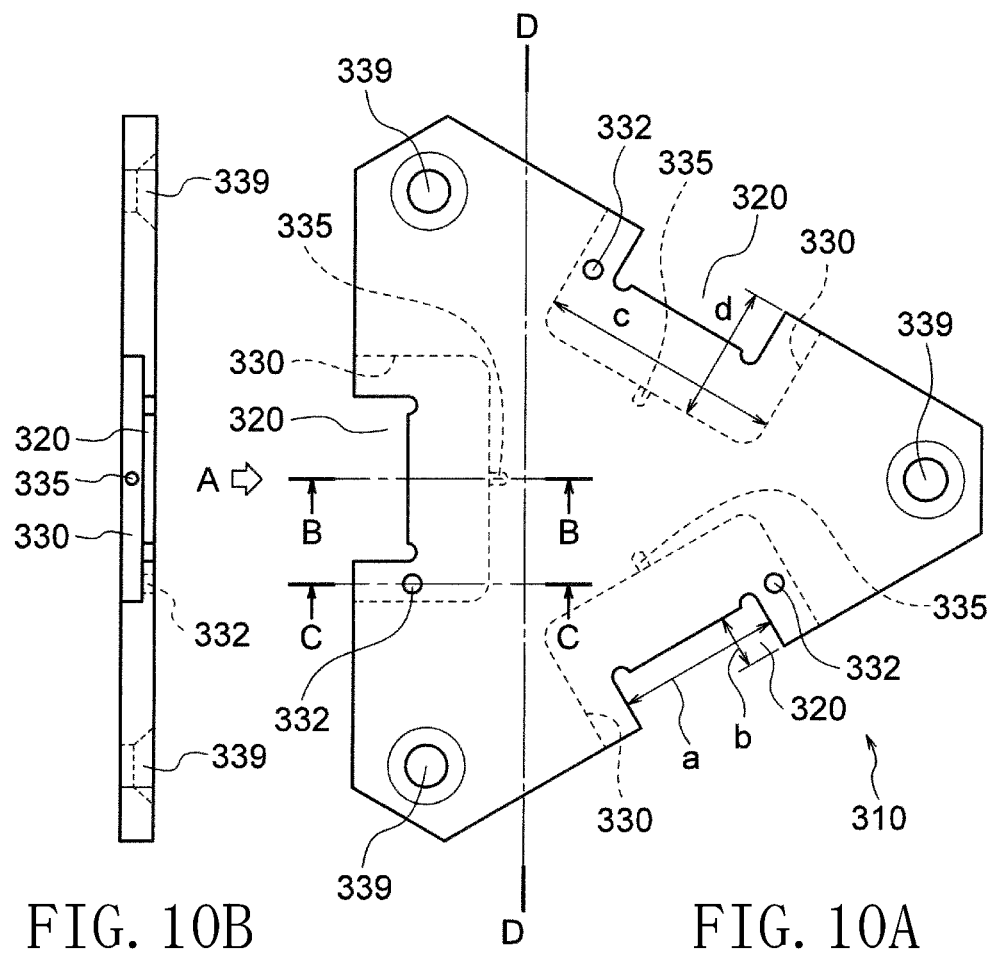
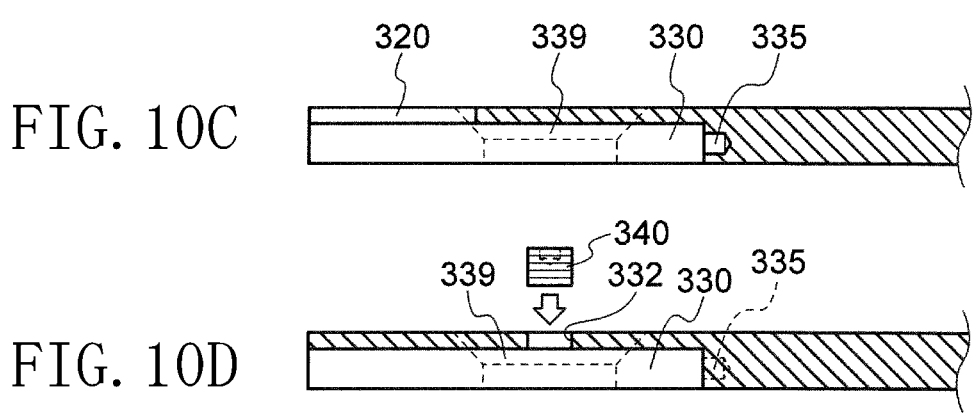
FIG. 10B  FIG. 10A
FIG. 10C
FIG. 10D

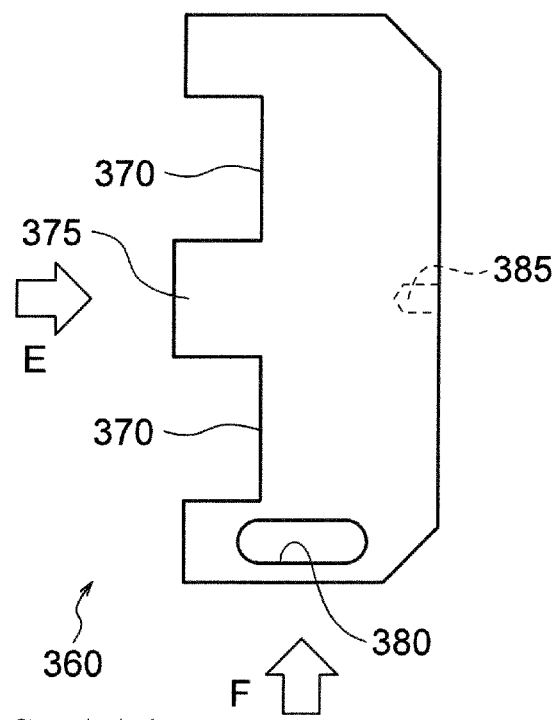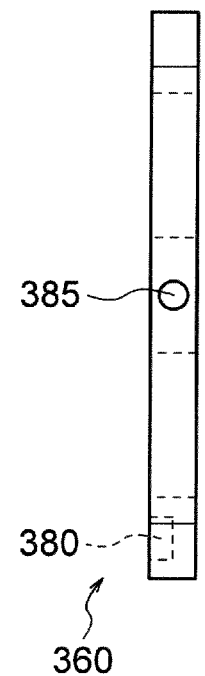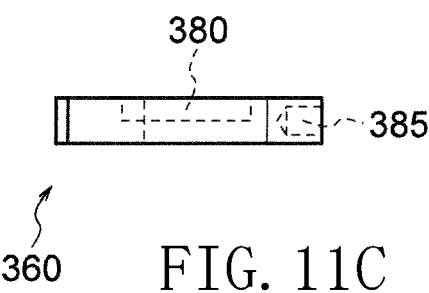
FIG. 11A   FIG. 11B
FIG. 11C

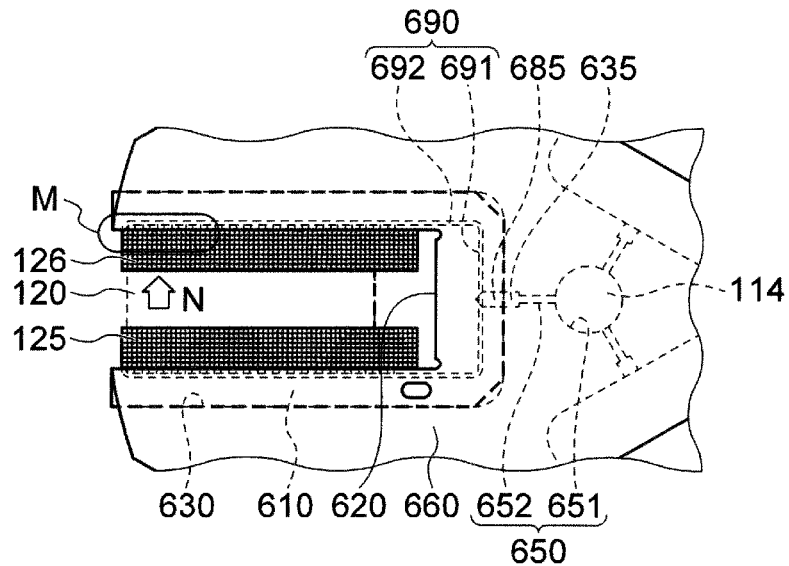
FIG. 16A
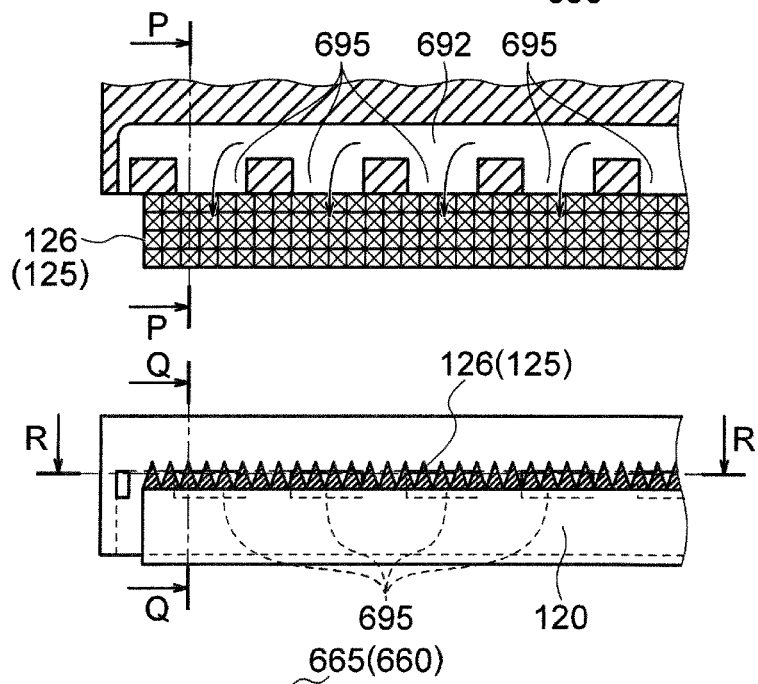
FIG. 16B
FIG. 16C
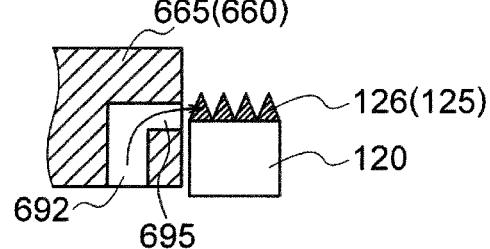
FIG. 16D

CHIP/DUST PREVENTION COVER, CHIP/DUST PREVENTION COVER SET, CHUCK MECHANISM, AND MACHINE TOOL

This application is the U.S. national phase of International Application No. PCT/JP2017/041069 filed Nov. 15, 2017 which designated the U.S. and claims priority to Japanese Patent Application No. 2016-222648 filed Nov. 15, 2016, the entire contents of each of which are hereby incorporated by reference.

TECHNICAL FIELD

The present invention relates to a chip/dust prevention cover which is installed in a chuck end face of a machine tool such as a lathe to block a gap formed in the chuck end face, a chip/dust prevention cover set which includes a plate appropriate in use along with the chip/dust prevention cover, a chuck mechanism which uses the chip/dust prevention cover set, and a machine tool which includes the chuck mechanism.

BACKGROUND ART

An example of a chuck used in a lathe is illustrated in FIGS. 12 and 13. FIGS. 12 and 13 are diagrams in which an end face 112 of a chuck main body 110 is viewed from the outside to the inside of the chuck main body 110 in the axial direction, FIG. 12 is a diagram illustrating a state in which a chuck is opened, and FIG. 13 is a diagram illustrating a state in which the chuck is closed. As illustrated in FIGS. 12 and 13, in the end face 112 of the chuck main body 110, a master jaw 120 is installed at each of three master jaw insertion grooves 115 and a soft jaw 210 for gripping a workpiece is attached to each master jaw 120. The master jaw 120 is installed inside the chuck main body 110 and three master jaws are simultaneously movable in the radial direction by the axial movement of a shifter (not illustrated). A cylindrical chuck cover 117 is inserted from a side of the end face 112 into a center hole of the chuck main body 110 and an end face on the side of the end face 112 of the chuck cover 117 is covered by a lid 118.

In order to perform a cutting process on a workpiece by the lathe, the soft jaw 210 is moved outward in the radial direction of the end face of the chuck main body 110 so that the chuck is opened as illustrated in FIG. 12 and the workpiece is fitted to the center part of the end face of the opened chuck main body 110. When the workpiece is disposed, the soft jaw 210 is moved inward in the radial direction so that the chuck is closed (the workpiece is not illustrated in the drawing) as illustrated in FIG. 13 and the workpiece is gripped by three soft jaws 210. Then, a spindle of the lathe is rotated and a tool is pressed against a processing face of the workpiece while the workpiece is rotated so that the workpiece is cut into a desired shape.

In order to perform a highly precise processing on a workpiece in a machine tool such as a lathe using a chuck, it is important to center the workpiece with high precision and to center the workpiece with good repeatability when attaching the workpiece again after detaching it once. As a chuck capable of coping with such demand, there is proposed a chuck mechanism in which a plurality of serrations are formed on a contact face between a master jaw and a soft jaw so as to extend in different directions and are engaged to prevent a deviation in the plane direction in the contact face between the soft jaw and the master jaw (for example, see Patent Document 1).

Incidentally, chips are generated when the workpiece is subjected to a cutting process, but when the chips adhere or accumulate on the soft jaw 210, the master jaw 120, the master jaw insertion groove 115, or the chuck main body 110, the risk of a chucking failure and deterioration in gripping accuracy (clamping accuracy) of the workpiece increases. Further, there is a risk that the attachment precision of the master jaw and the soft jaw is deteriorated at the time of replacing (setting up) the soft jaw. For that reason, there is a need to prevent chips from adhering or accumulating in the periphery of the soft jaw 210 or the master jaw 120.

However, since the master jaw 120 moves in the radial direction of the end face 112 of the chuck main body 110 to open or close the chuck as described above, it is essential to form a space allowing the movement of the master jaw 120 between the end face at the center side of the master jaw 120 in the radial direction and the outer diameter part of the chuck cover 117 (chuck cover lid 118). That is, a gap 119 indicated by a dashed line illustrated in FIGS. 12 and 13 is necessary. As a result, since chips intrude and accumulate in the gap 119, there is a problem that the risk of causing a chucking failure or a processing error increases.

In such a case, an operation of preventing the intrusion of chips by an air blow was performed in the past. However, since the gap 119 at the center side of the master jaw 120 in the radial direction is comparatively deep, it is difficult to completely prevent the intrusion of chips even by the air blow. Particularly, chips and the like of the cast are liable to accumulate in the gap 119 and improvement thereof is desired.

Further, when such a problem exists, an operator needs to perform a processing using the lathe or the like while paying a careful attention at all times. Since such a case disturbs an automated operation, an unattended operation, a maintenance-free operation, or the like of a machine tool such as a lathe, improvement of productivity and machine operation rate cannot be expected. Also from this viewpoint, the chuck mechanism in which chips do not intrude and accumulate is strongly demanded.

CITATION LIST

Patent Document

Patent Document 1: JP 4273218 B2

SUMMARY OF THE INVENTION

Problem to be Solved by the Invention

An object of the invention is to provide a chip/dust prevention cover, a chip/dust prevention cover set, a chuck mechanism, and a machine tool capable of preventing chips from intruding or accumulating in a chuck mechanism, particularly preventing chips from intruding or accumulating in a gap between a chuck cover of a chuck center part and an inner end face of a master jaw in the radial direction, and as a result, performing a desired cutting process with high precision and efficiency, performing an automated operation, an unattended operation, a maintenance-free operation, or the like of a machine tool such as a lathe, and achieving improvement of productivity and machine operation rate.

Means for Solving Problem

A chip/dust prevention cover of the invention is a chip/dust prevention cover installed in a chuck end face, including: a plate face part which covers a predetermined region at a center side of the chuck end face in master jaws disposed radially; a close contact part which is in close contact with an end part at the center side of a movement member corresponding to the master jaw, the movement member including the master jaw and a member installed in the master jaw and integrated with the master jaw; and a force receiving part which maintains the close contact state while moving the chip/dust prevention cover in a following manner in accordance with a predetermined movement of the movement member corresponding to the master jaw in a radial direction of the chuck end face.

Here, the "predetermined region at a center side of the chuck end face" covered by the plate face part indicates, for example, a region including a gap formed in the chuck end face such as a gap formed between the chuck cover of the chuck center part and the inner end face of the master jaw in the radial direction. Preferably, the region includes the gap.

Further, the "movement member corresponding to the master jaw" indicates, for example, a concept including a master jaw, a soft jaw installed in the master jaw, and a member for installing the soft jaw in the master jaw. The member includes a so-called T-shaped nut or a stair form member exemplified in the embodiment. These members are fixed to the master jaw and are movable in the radial direction of the chuck along with the master jaw when the workpiece is gripped by the chuck. In this way, the "movement member corresponding to the master jaw" includes an arbitrary member integrated with the master jaw when the workpiece is gripped by the chuck.

Further, the "predetermined movement" of the chuck end face of the movement member corresponding to the master jaw in the radial direction indicates the movement of the movement member corresponding to the master jaw with respect to the end face of the chuck main body between the most center side position when the movement member corresponding to the master jaw is moved inward in the radial direction of the end face of the chuck main body to close the chuck in order to grip the workpiece by the soft jaw and the outermost position when the movement member corresponding to the master jaw is moved outward in the radial direction of the end face of the chuck main body to open the chuck in order to fit the workpiece to the center part of the end face of the chuck main body.

Preferably, in the chip/dust prevention cover of the invention, the close contact part includes a first close contact part which is in close contact with the center side of a serration face part of the master jaw.

Further, preferably, in the chip/dust prevention cover of the invention, the close contact part includes a second close contact part which is in close contact with a part other than a serration face part of the master jaw of the movement member corresponding to the master jaw.

Further, preferably, the chip/dust prevention cover of the invention further includes: a master jaw side extension part which extends to both sides of the master jaw in a radial direction; an air outlet which is formed in the master jaw side extension part and blows an air flow to a serration face of the master jaw; and a chip/dust prevention cover air groove which supplies an air flow supplied from a predetermined position to the air outlet.

Further, a chuck end face plate of the invention is a chuck end face plate installed in a chuck end face including: a chip/dust prevention cover installation guide part to which the above-described chip/dust prevention cover is attachable so as to be movable in a radial direction of the chuck end face; and an urging member that applies an urging force to the chip/dust prevention cover attached to the chip/dust prevention cover installation guide part.

Further, a chuck end face plate of the invention is a chuck end face plate installed in a chuck end face, including: a chip/dust prevention cover installation guide part to which the above-described chip/dust prevention cover is attachable so as to be movable in a radial direction of the chuck end face; an urging member that applies an urging force to the chip/dust prevention cover attached to the chip/dust prevention cover installation guide part; and a top plate air groove which supplies an air flow supplied through a pipe installed in a chuck main body to the chip/dust prevention cover air groove of the chip/dust prevention cover.

Further, a chip/dust prevention cover set of the invention includes the chip/dust prevention cover and the chuck end face plate.

Further, the chip/dust prevention cover set of the invention includes the chip/dust prevention cover including a chip/dust prevention cover air groove and the above-described chuck end face plate including a top plate air groove.

Furthermore, preferably, the chip/dust prevention cover set of the invention further includes: the chip/dust prevention covers which are provided for the master jaws disposed radially; and the chuck end face plate which includes the chip/dust prevention cover installation guide parts for the chip/dust prevention covers and the urging members for the chip/dust prevention covers.

Further, preferably, the chip/dust prevention cover set of the invention further includes a chip/dust prevention cover fixing member that includes the chip/dust prevention cover installation guide part of the chuck end face plate and the chip/dust prevention cover and defines a movement range of the chip/dust prevention cover.

Further, the chuck mechanism of the invention includes the above-described chip/dust prevention cover set.

Further, the machine tool of the invention includes the above-described chuck mechanism.

Effect of the Invention

According to the invention, it is possible to provide a chip/dust prevention cover, a chip/dust prevention cover set, a chuck mechanism, and a machine tool capable of preventing chips from intruding or accumulating in a chuck mechanism, particularly preventing chips from intruding or accumulating in a gap between a chuck cover of a chuck center part and an inner end face of a master jaw in the radial direction, and as a result, performing a desired cutting process with high precision and efficiency, performing an automated operation, an unattended operation, a maintenance-free operation, or the like of a machine tool such as a lathe, and achieving improvement of productivity and machine operation rate.

BRIEF DESCRIPTION OF DRAWINGS

FIGS. 5A to 5D are diagrams illustrating a configuration of a serration piece of the stair form member attached jaw illustrated in FIGS. 3A to 3C;

FIGS. 10A to 10D are diagrams illustrating a configuration of a top plate;

FIGS. 11A to 11C are diagrams illustrating a configuration of the top cover (chip/dust prevention cover);

FIGS. 16A to 16D are diagram schematically illustrating a state in which a chuck main body is provided with the top plate illustrated in FIGS. 14A and 14B, the top cover illustrated in FIGS. 15A to 15E, and a master jaw;

MODE(S) FOR CARRYING OUT THE INVENTION

First Embodiment

A lathe of an embodiment of the invention which is a first embodiment of the invention will be described with reference to FIGS. 1 to 11.

Figure 1:
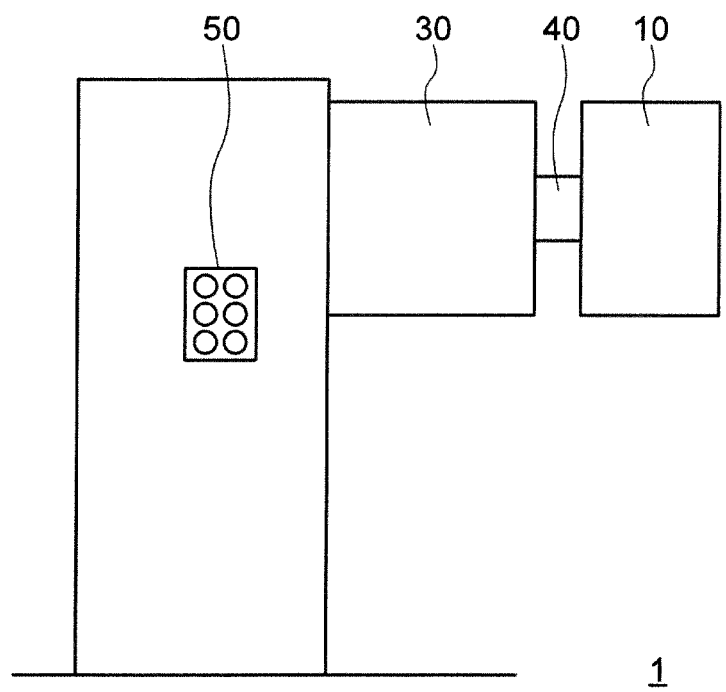
FIG. 1 is a diagram illustrating a configuration of a lathe of an embodiment of the invention according to a first embodiment of the invention.

FIG. 1 is a diagram illustrating a schematic configuration of the lathe of the embodiment of the invention.

As illustrated in FIG. 1, a lathe 1 of the embodiment includes a chuck mechanism 10 which grips a workpiece corresponding to a processing target, a motor 30 which rotationally drives the chuck mechanism 10, a spindle 40 which transmits rotation power of the motor 30 to the chuck mechanism 10, and a control unit 50 which controls an operation of the motor 30.

Figure 2:
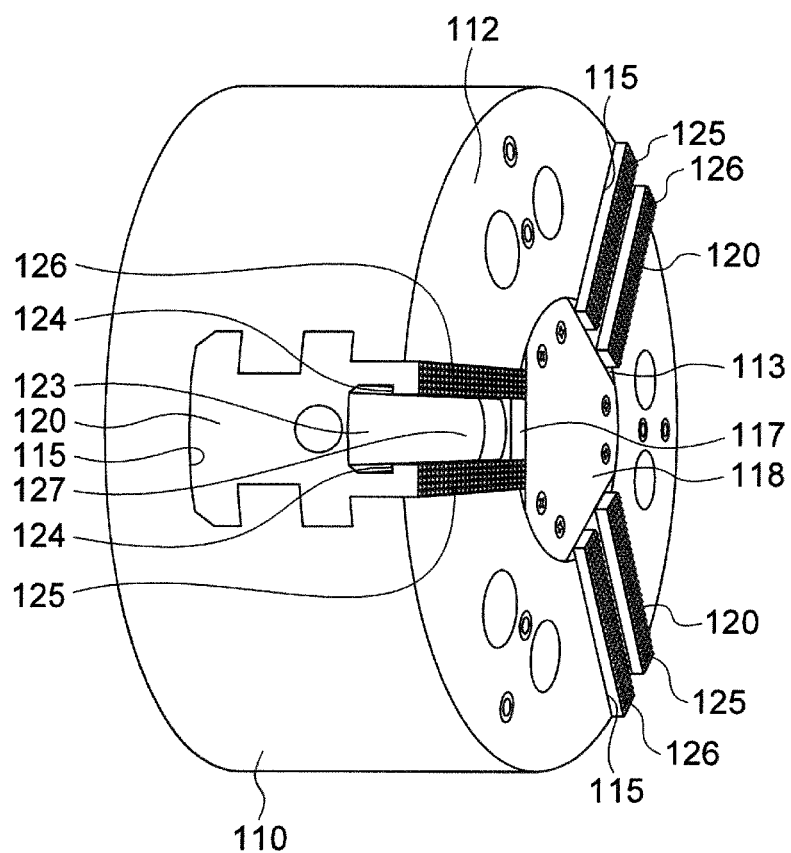
FIG. 2 is a diagram illustrating a configuration of a master jaw and a chuck main body of a chuck mechanism according to the invention.
Figure 3A:
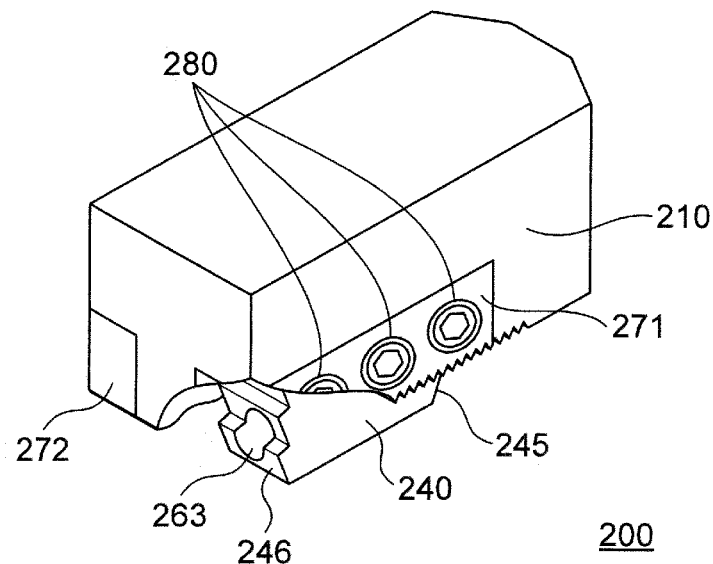
FIGS. 3A to 3C are diagrams illustrating a configuration of a stair form member attached jaw of the chuck mechanism according to the invention.
Figures 3B, 3C:
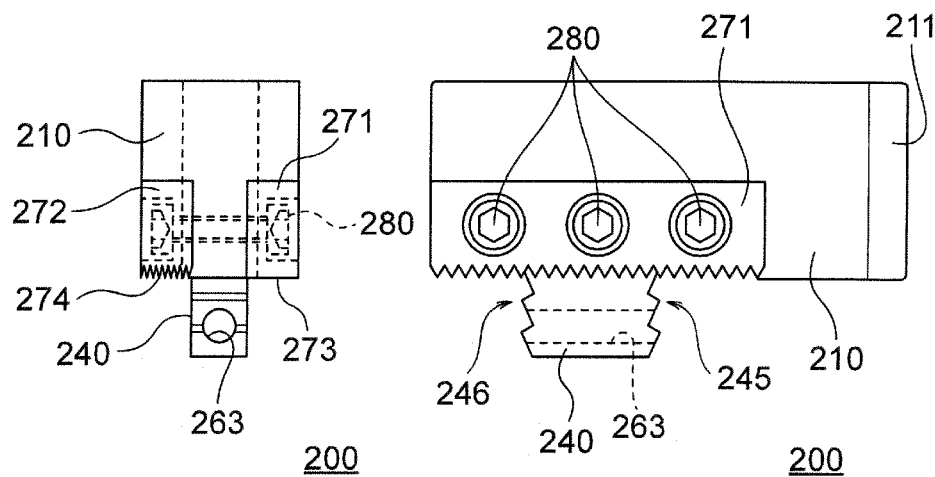
Figures 6A, 6B:
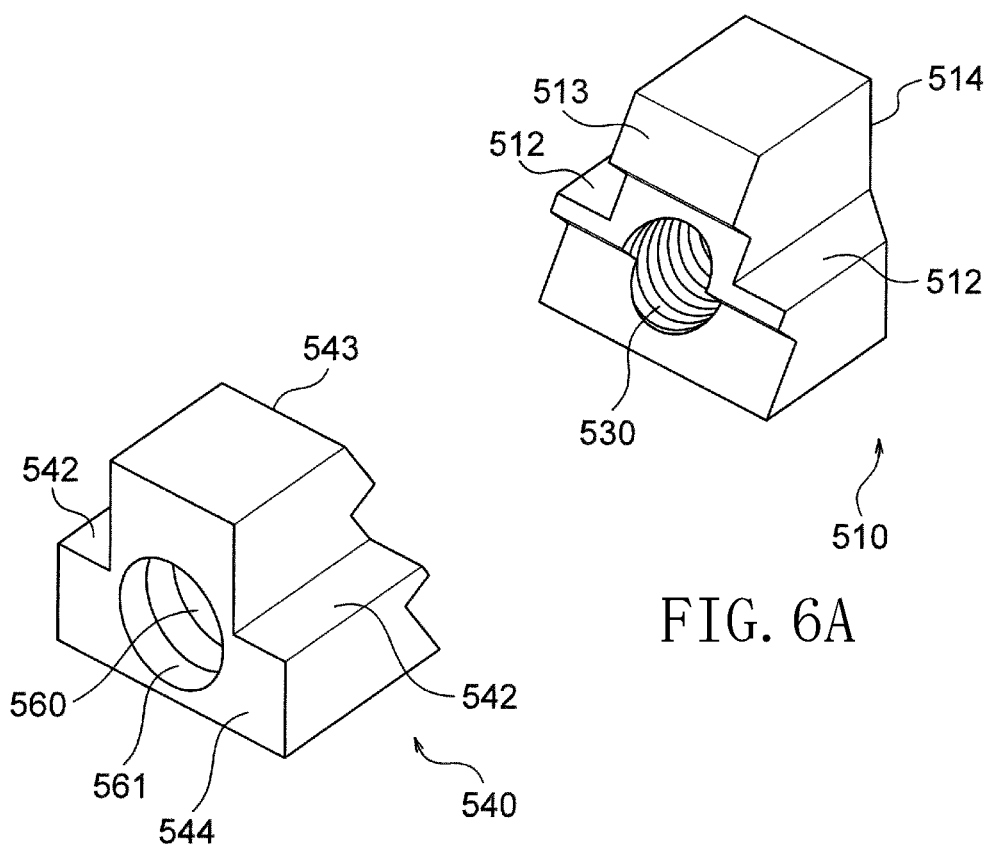
FIGS. 6A and 6B are diagrams illustrating a configuration of a front grip and a rear grip of the chuck mechanism according to the invention.

The chuck mechanism 10 includes a chuck main body 110 and a master jaw 120 illustrated in FIG. 2, a stair form member attached jaw 200 illustrated in FIGS. 3A to 3C, a pair of grips 510 and 540 illustrated in FIGS. 6A and 6B, a top plate 310 illustrated in FIGS. 10A to 10D, and a top cover (chip/dust prevention cover) 360 illustrated in FIGS. 11A to 11C.

FIG. 2 is a diagram illustrating a configuration of the chuck main body 110 and the master jaw 120 of the chuck mechanism 10.

The chuck main body 110 is formed in a cylindrical shape and three master jaw insertion grooves 115 for installing the master jaw 120 in a radial direction are formed at an equal interval in an end face 112. The master jaw insertion groove 115 has a cross-sectional shape in which a wide bottom part and a narrow upper part are connected in two stages and is formed into a predetermined length in the radial direction from the outer peripheral face of the chuck main body. A cylindrical chuck cover 117 is inserted from the side of the end face 112 into a center hole 113 of the chuck main body 110 and an end face on the side of the end face 112 of the chuck cover 117 is covered by a lid 118. A shifter (not illustrated) for moving the master jaw 120 in the radial direction while engaging with the master jaw 120 installed in the master jaw insertion groove 115 is installed inside the chuck main body 110.

The master jaw 120 is a seat for attaching the stair form member attached jaw 200 to the chuck main body 110. The master jaw 120 is a metal member that has a cross-sectional shape and a size to be accommodated while contacting the inside of the master jaw insertion groove 115 of the chuck main body 110. A jaw installing groove 123 for attaching the stair form member attached jaw 200 is formed on the upper face of the master jaw 120 in the longitudinal direction. The jaw installing groove 123 has a T-shaped cross-section including a wide bottom part and a narrow upper part and a stepped face which is a boundary between the upper part and the bottom part and is directed downward is formed in a shoulder part (supporting face for pulling down) 124 used when pulling the stair form member attached jaw 200 down.

The upper face of the master jaw 120 is provided with serration faces 125 and 126 which interpose an upper opening (groove opening part) 127 of the jaw installing groove 123 on both sides thereof. The serration faces 125 and 126 have a structure in which a plurality of quadrangular pyramidal spikes are aligned in a direction perpendicular to the extension direction of the jaw installing groove 123 and a direction parallel to the extension direction. The spikes having such a structure are formed by forming, for example, longitudinal gears extending in a direction perpendicular to the extension direction of the jaw installing groove 123, arranged at a predetermined pitch in a parallel direction, and having triangular cross-sections and transverse gears extending in a direction parallel to the extension direction of the jaw installing groove 123, arranged at a predetermined pitch in a vertical direction, and having triangular cross-sections on the same plane.

The height of the master jaw 120 is slightly higher than the depth of the master jaw insertion groove 115 of the chuck main body 110. In other words, the upper faces of serration faces 125 and 126 of the master jaw 120 slightly protrude in relation to the end face 112 of the chuck main body 110 (see FIG. 2).

In the master jaw 120, an engagement part protruding from a bottom part (not illustrated) engages with a shifter (not illustrated) installed inside the chuck main body 110 and three master jaws 120 simultaneously move in the radial direction of the chuck main body 110 in accordance with the axial movement of the shifter.

Figure 4A:
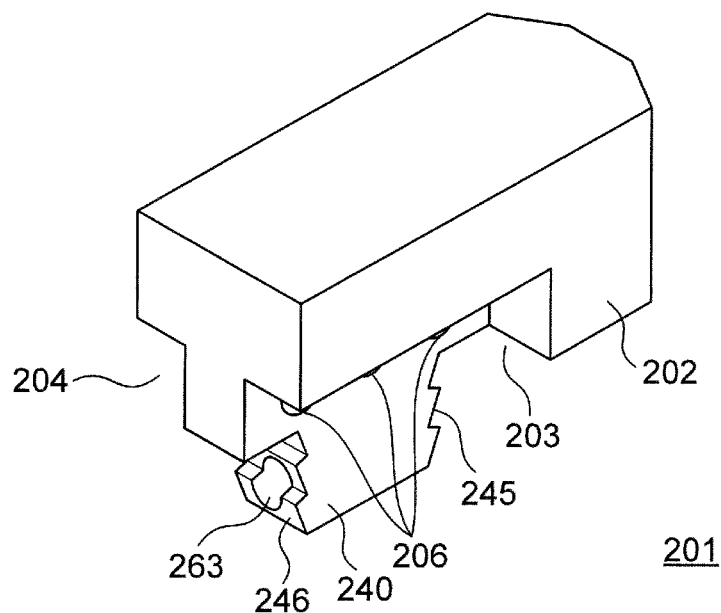
FIGS. 4A to 4C are diagrams illustrating a configuration of a stair form member attached jaw main body of the stair form member attached jaw illustrated in FIGS. 3A to 3C.
Figures 4B, 4C:
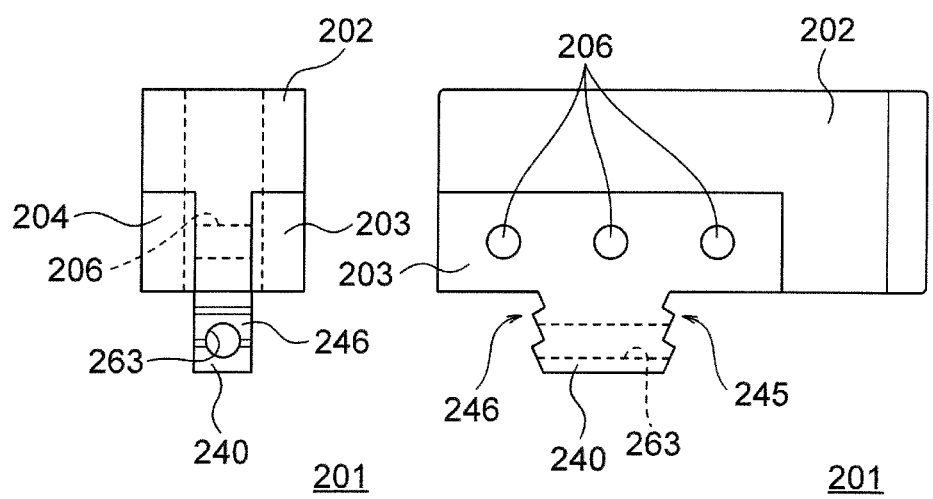

FIGS. 3A to 3C are diagrams illustrating a structure of the stair form member attached jaw 200, FIG. 3A is a partially cutaway perspective view, FIG. 3B is a side view, and FIG. 3C is a front view. Further, FIGS. 4A to 4C are diagrams illustrating a structure of a stair form member attached jaw main body 201 of the stair form member attached jaw 200 illustrated in FIGS. 3A to 3C, FIG. 4A is a partially cutaway perspective view, FIG. 4B is a side view, and FIG. 4C is a front view. Further, FIGS. 5A to 5D are diagrams illustrating a structure of serration pieces 271 and 272 of the stair form member attached jaw 200 illustrated in FIGS. 3A to 3C, FIG. 5A is a perspective view of the transverse serration piece 271, FIG. 5B is a diagram illustrating a gear of a serration face 273 of the transverse serration piece 271, FIG. 5C is a perspective view of the longitudinal serration piece 272, and FIG. 5D is a diagram illustrating a gear of a serration face 274 of the longitudinal serration piece 272.

As illustrated in FIG. 3A, the stair form member attached jaw 200 is a member in which a soft jaw 210 for gripping a workpiece is integrated with a stair form member 240 for installing the soft jaw 210 in the master jaw 120.

As illustrated in FIG. 3B, a front end part of the soft jaw 210 is formed in a workpiece holding part 211 for forming a workpiece holding face which grips a workpiece while contacting the workpiece. The soft jaw 210 of the embodiment is a soft jaw. In a case in which the workpiece is subjected to cutting, the workpiece is gripped by three soft jaws 210. However, in order to grip the workpiece while the workpiece holding part 211 of each soft jaw 210 grips the workpiece at an appropriate contact face and is completely centered with respect to the chuck main body 110, the workpiece holding part 211 is first processed so that the workpiece holding face is formed in the workpiece holding part 211. That is, a so-called soft jaw is formed. Then, the workpiece is actually gripped by three soft jaws 210 and the workpiece is subjected to cutting.

As illustrated in FIG. 3C, the transverse serration face 273 and the longitudinal serration face 274 are formed at both sides of the lower face of the soft jaw 210. Each of the transverse serration face 273 and the longitudinal serration face 274 has a structure in which a plurality of gears having substantially triangular cross-sections are arranged at a predetermined pitch. The transverse serration face 273 is a serration face which has a structure formed such that gears extending in the width direction (short direction) of the soft jaw 210 are arranged at a predetermined pitch in the longitudinal direction of the soft jaw 210 and engages with one serration face 125 of the master jaw 120 (see FIG. 2). Further, the longitudinal serration face 274 is a serration face which has a structure formed such that gears extending in the longitudinal direction of the soft jaw 210 are arranged at a predetermined pitch in the width direction (short direction) of the soft jaw 210 and engages with the other serration face 126 of the master jaw 120 (see FIG. 2).

The stair form member attached jaw 200 has a structure in which the stair form member attached jaw main body 201 illustrated in FIGS. 4A to 4C, the transverse serration piece 271 illustrated in FIG. 5A, and the longitudinal serration piece 272 illustrated in FIG. 5B are assembled to be integrated by a serration piece attachment bolt 280.

The stair form member attached jaw main body 201 is a member in which a jaw main body 202 is integrated with the stair form member 240 as illustrated in FIGS. 4A to 4C.

The jaw main body 202 is a member for forming serration piece notches 203 and 204 to have a predetermined length from an end part opposite to the workpiece holding part 211 at the lower side of both side faces of the soft jaw 210 (see FIGS. 3A to 3C) in the width direction. In other words, the jaw main body is a member in which a part corresponding to the serration pieces 271 and 272 is removed from the soft jaw 210.

The stair form member 240 is a metal member for installing the soft jaw 210 in the master jaw 120. Each of a rear end face 245 and a front end face 246 of the stair form member 240 is formed as a corrugated engagement face. This corrugated engagement face is formed in a shape to be drawn downward with respect to the grips 510 and 540 in such a manner that the stair form member 240 is sandwiched and fastened by the grips 510 and 540 which have opposite corrugated engagement faces facing each other and will be described later.

As a result, the serrations of the serration faces 273 and 274 of the soft jaw 210 reliably engage with the serrations of the serration faces 125 and 126 of the master jaw 120 so that the soft jaw 210 is accurately installed at a predetermined position of the master jaw 120. For that reason, the stair form member 240 is provided with a clamping bolt passage hole 263 through which a clamping bolt 570 (see FIG. 7C) for connecting the stair form member 240 and the grips 510 and 540 passes is formed to penetrate between the rear end face 245 and the front end face 246 in the longitudinal direction of the soft jaw 210.

As illustrated in FIG. 5A, the transverse serration piece 271 is a rectangular parallelepiped metal member. The transverse serration piece 271 is provided with a bolt passage hole 275 which is formed to penetrate between both side faces in the width direction. A spot 277 which accommodates a head part of the serration piece attachment bolt 280 (see FIGS. 3A to 3C) is formed in the periphery of the bolt passage hole 275 in a side face corresponding to an outer face when being installed in the stair form member attached jaw main body 201. As illustrated in FIG. 5B, the lower face of the transverse serration piece 271 is formed in the transverse serration face 273 provided with the gear extending in the short direction (width direction) of the transverse serration piece 271.

As illustrated in FIG. 5C, the longitudinal serration piece 272 is a rectangular parallelepiped metal member that has substantially the same size as that of the transverse serration piece 271. The longitudinal serration piece 272 is provided with a bolt passage hole 276 penetrating between both side faces in the width direction as well. A spot 278 which accommodates a nut into which the serration piece attachment bolt 280 (see FIGS. 3A to 3C) is threaded is formed in the periphery of the bolt passage hole 276 of a side face corresponding to an outer face to be engaged when being installed in the stair form member attached jaw main body 201. As illustrated in FIG. 5D, the lower face of the longitudinal serration piece 272 is formed in the serration face 274 provided with a gear extending in the longitudinal direction of the longitudinal serration piece 272.

The transverse serration piece 271 and the longitudinal serration piece 272 with such a configuration are respectively disposed at the serration piece notches 203 and 204 of the stair form member attached jaw main body 201 illustrated in FIGS. 4A to 4C, three serration piece attachment bolts 280 (see FIGS. 3A to 3C) are installed so as to respectively pass through the bolt passage holes 275 and 276 of the serration pieces 271 and 272 and the bolt passage hole 206 of the stair form member attached jaw main body 201 at three positions (see FIGS. 4A to 4C), and these members are fastened by a nut (not illustrated). As a result, the stair form member attached jaw 200 illustrated in FIGS. 3A to 3C is formed.

FIGS. 6A and 6B are diagrams illustrating a configuration of the rear grip 510 and the front grip 540 of the chuck mechanism 10.

Figure 7A:
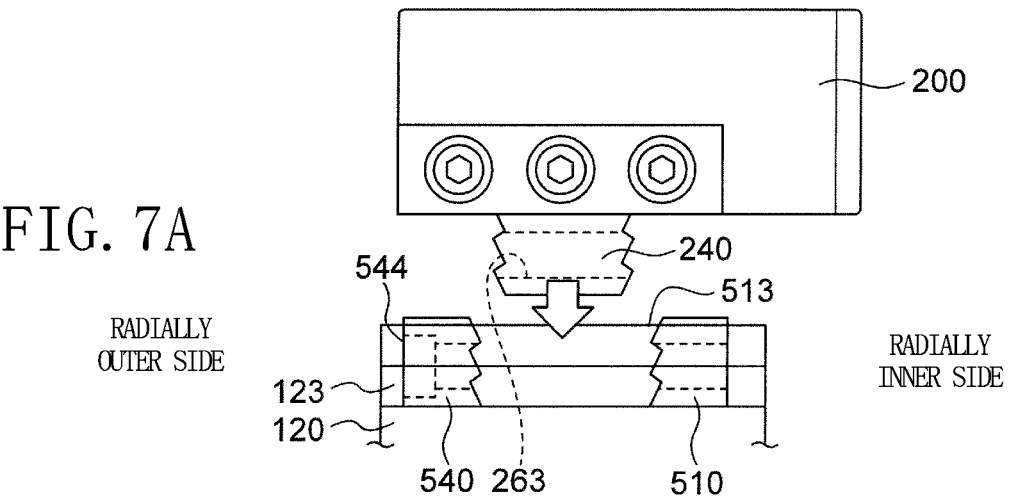
FIGS. 7A to 7C are diagrams illustrating a procedure of installing the stair form member attached jaw illustrated in FIGS. 3A to 3C in the master jaw illustrated in FIG. 2.
Figure 7B:
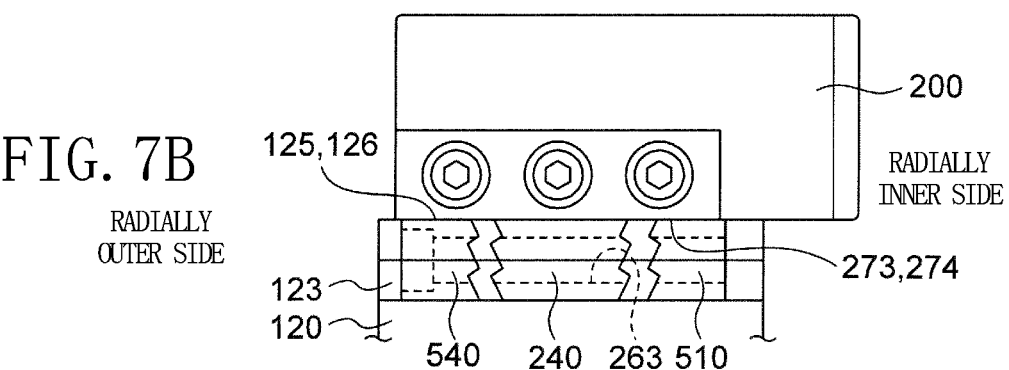
Figure 7C:
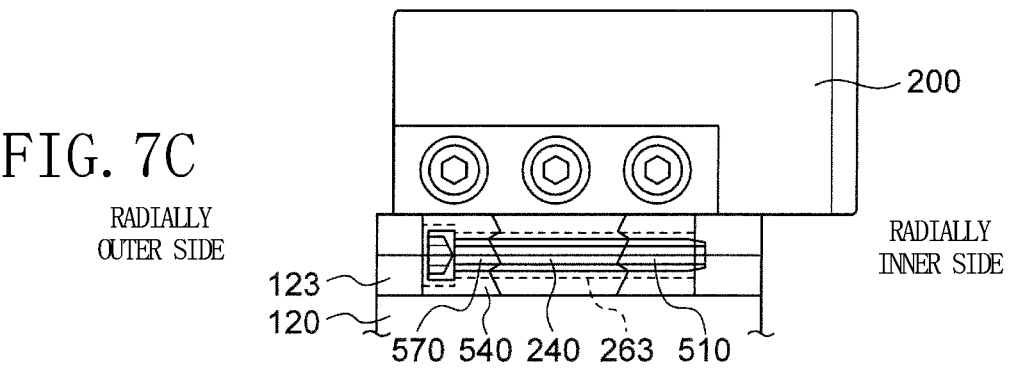

The rear grip 510 and the front grip 540 are inserted into the jaw installing groove 123 (see FIG. 2) of the master jaw 120 and sandwich the stair form member 240 (see FIGS. 3A to 3C) of the stair form member attached jaw 200 from both sides so that the stair form member attached jaw 200 is fixed to the master jaw 120 (see FIGS. 7A to 7C). Thus, each of the grips 510 and 540 is a metal member having a cross-section to be accommodated while contacting the inside of the jaw installing groove 123 of the master jaw 120, that is, a T-shaped cross-section which is the same as that of the jaw installing groove 123.

In the rear grip 510, an end face 513 which is formed at an outer diameter side while being inserted into the jaw installing groove 123 of the master jaw 120 is formed in an opposite corrugated engagement face 513 facing and contacting the rear end face 245 of the stair form member 240 of the stair form member attached jaw 200. Further, in the front grip 540, an end face which is formed at an inner diameter side while being inserted into the jaw installing groove 123 of the master jaw 120 is formed in an opposite corrugated engagement face 543 described to face the front end face 246 of the stair form member 240 of the stair form member attached jaw 200.

The rear grip 510 and the front grip 540 are provided with stepped faces 512 and 542 which are formed at both sides in the width direction when being inserted into the jaw installing groove 123 so as to face and contact the shoulder part 124 of the jaw installing groove 123 of the master jaw 120. As will be described later, the stepped faces 512 and 542 become supporting faces for pulling down at the time of pulling the stair form member attached jaw 200 by fastening the stair form member 240 of the stair form member attached jaw 200. Further, an end part at the inner diameter side of the stepped face 512 of the rear grip 510 is formed as an inclined face which is notched in a chamfered state so as not to interfere with a corner part at the inner diameter side of the jaw installing groove 123 when being inserted into the jaw installing groove 123 of the master jaw 120.

Further, the grips 510 and 540 are provided with clamping bolt holes 530 and 560 which are formed in the extension direction of the jaw installing groove 123 when these members are inserted into the jaw installing groove 123 of the master jaw 120. The clamping bolt hole 530 of the rear grip 510 is provided with a screw groove into which a screw part of a front end of a clamping bolt is threaded. Further, a spot 561 which accommodates a head part of a clamping bolt is formed at the side of an end face 544 on the outer diameter side of the clamping bolt hole 560 formed in the front grip 540 so as to be coaxial to the clamping bolt hole 560.

A method of installing the stair form member attached jaw 200 in the master jaw 120 by the rear grip 510 and the front grip 540 will be described with reference to FIGS. 7A to 7C.

FIGS. 7A to 7C are diagrams for describing a procedure of installing the stair form member attached jaw 200 in the master jaw 120, respectively.

Furthermore, it is assumed that the master jaw 120 is installed in the master jaw insertion groove 115 of the chuck main body 110.

First, as illustrated in FIG. 7A, the grips 510 and 540 are inserted into the jaw installing groove 123 of the master jaw 120. First, the rear grip 510 is inserted into the jaw installing groove 123 in a direction in which the end face (opposite corrugated engagement face) 513 on the outer diameter side is located at the outer diameter side and then the front grip 540 is inserted into the jaw installing groove 123 in a direction in which the end face 544 on the outer diameter side is located at the outer diameter side. As a result, the grips 510 and 540 are installed in the jaw installing groove 123 of the master jaw 120 in the manner illustrated in FIG. 7A.

Next, the stair form member attached jaw 200 is installed in the master jaw 120. The stair form member attached jaw 200 is moved from the upper side of the jaw installing groove 123 of the master jaw 120 to the jaw installing groove 123 of the master jaw 120 so that the stair form member 240 is inserted into the jaw installing groove 123 as illustrated in FIG. 7A and the soft jaw 210 is disposed to be in contact with the master jaw 120 as illustrated in FIG. 7B. At this time, the serrations of the serration faces 273 and 274 of the lower face of the soft jaw 210 of the stair form member attached jaw 200 engage with the serrations of the serration faces 125 and 126 of the master jaw 120 at a predetermined position (see FIGS. 2 and 5). Accordingly, the stair form member attached jaw 200 is disposed at a predetermined position of the master jaw 120 in the radial direction and the circumferential direction.

When the stair form member 240 of the stair form member attached jaw 200 is inserted into the jaw installing groove 123, the clamping bolt 570 is inserted from the end part of the master jaw 120 of the outer peripheral face of the chuck main body 110 as illustrated in FIG. 7C. The clamping bolt 570 is inserted from a part of the clamping bolt spot 561 of the end face 544 (see FIG. 6B) on the outer diameter side of the front grip 540 into the clamping bolt hole 560, passes through the clamping bolt passage hole 263 from the front end face 246 (see FIGS. 3A to 3C) of the stair form member 240 to the rear end face 245, and is threaded into the clamping bolt hole 530 of the rear grip 510 formed in the screw hole.

When the clamping bolt 570 is fastened in this state, a gap between the rear grip 510 and the front grip 540 is narrowed, the corrugated engagement faces (245, 246) of the stair form member 240 of the stair form member attached jaw 200 engage with the opposite corrugated engagement faces (513, 543) of the grips 510 and 540, and the stair form member attached jaw 200 is pulled downward with respect to the grips 510 and 540. At this time, since the stepped faces 512 and 542 (see FIGS. 6A and 6B) of the grips 510 and 540 are supported while contacting the stepped face (supporting face for pulling down) 124 of the master jaw 120 so as not to move toward the end face 112 of the chuck main body 110, the stair form member attached jaw 200 is pulled in the depth direction of the jaw installing groove 123 with respect to the master jaw 120 and the serrations (streaky gear) of the serration faces 273 and 274 of the lower face of the stair form member attached jaw 200 deeply engage with the serrations (spikes) of the serration faces 125 and 126 of the master jaw 120. As a result, since the centers of these serrations are precisely aligned, the position of the soft jaw 210 of the stair form member attached jaw 200 is also highly precisely positioned.

Next, the top plate 310 and the top cover 360 according to the invention will be described with reference to FIGS. 8 to 11. Furthermore, a structure including the top plate 310 and three top covers 360 will be referred to as a top cover set (chip/dust prevention cover set) 300.

Figure 8:
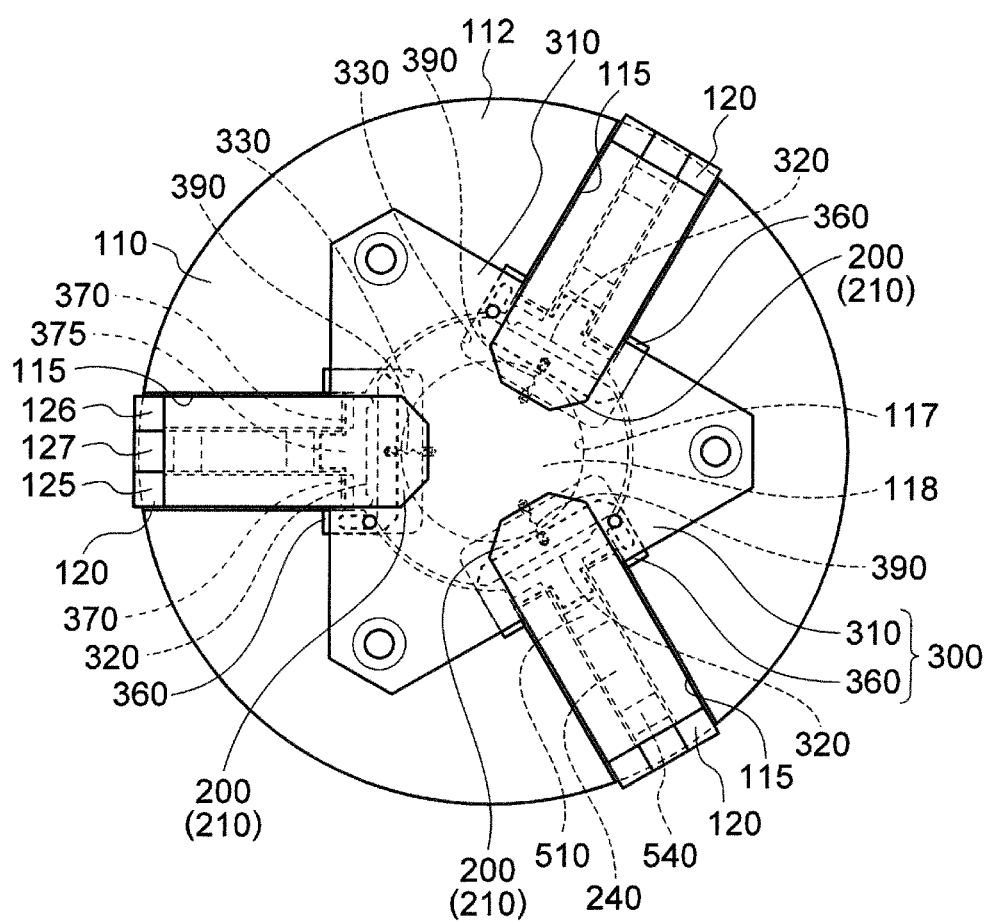
FIG. 8 is a diagram illustrating a state of an end face of the chuck main body when a chuck is opened.
Figure 9:
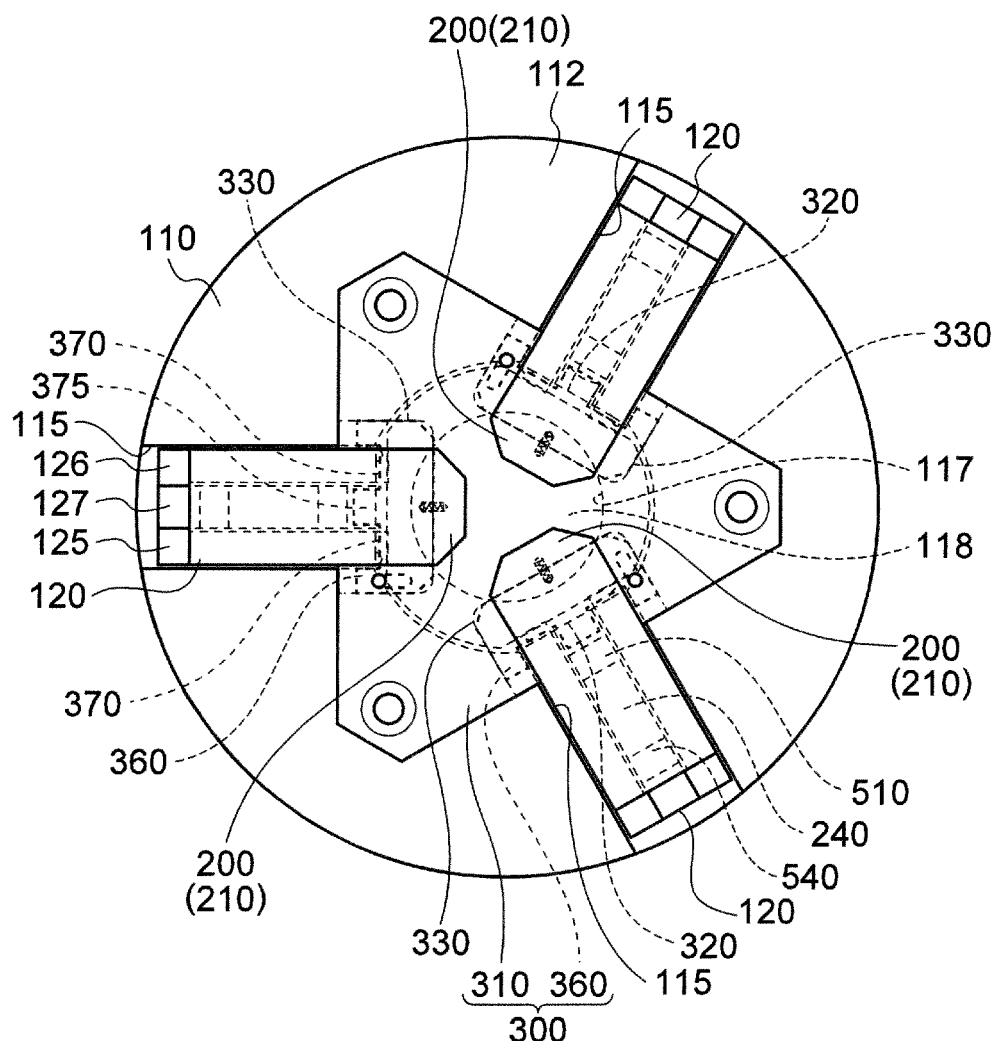
FIG. 9 is a diagram illustrating a state of the end face of the chuck main body when the chuck is closed.
Figure 12:
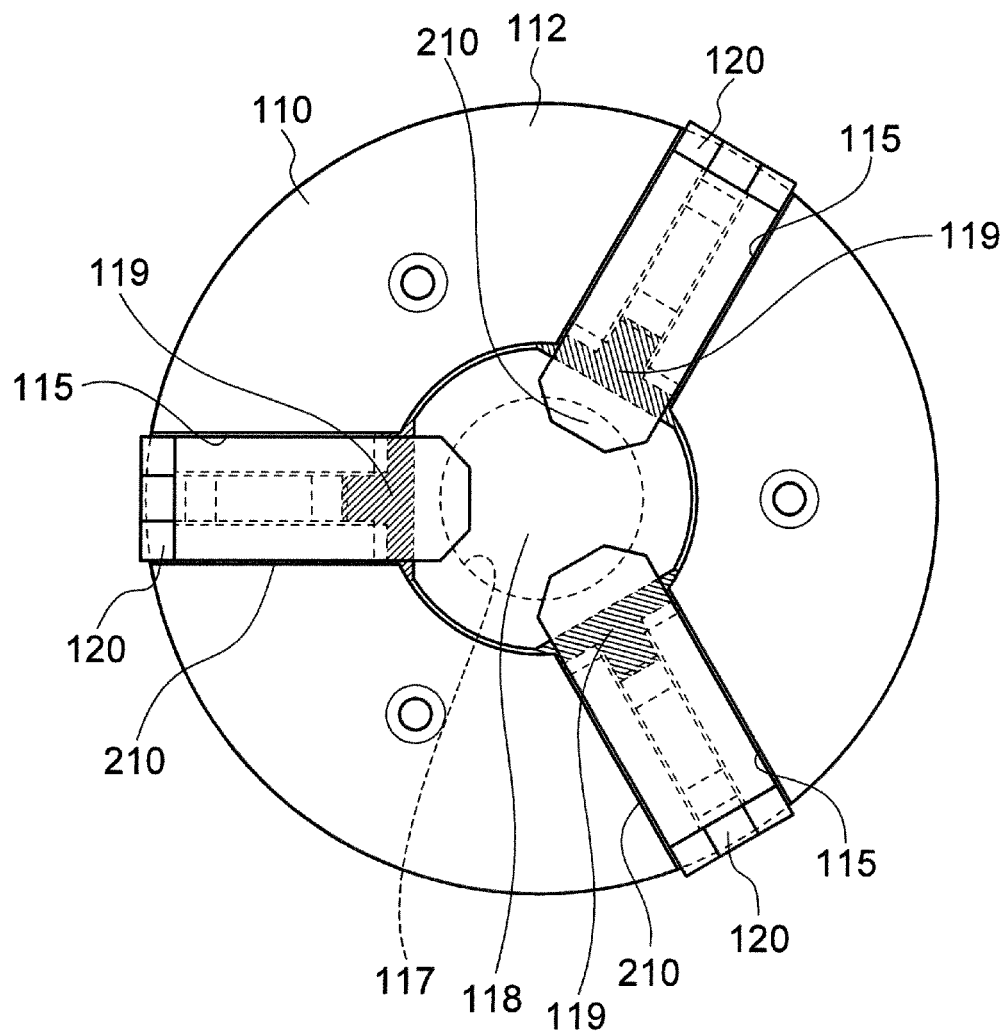
FIG. 12 is a diagram illustrating a state of an end face of a chuck main body when a chuck is opened in a conventional chuck mechanism.
Figure 13:
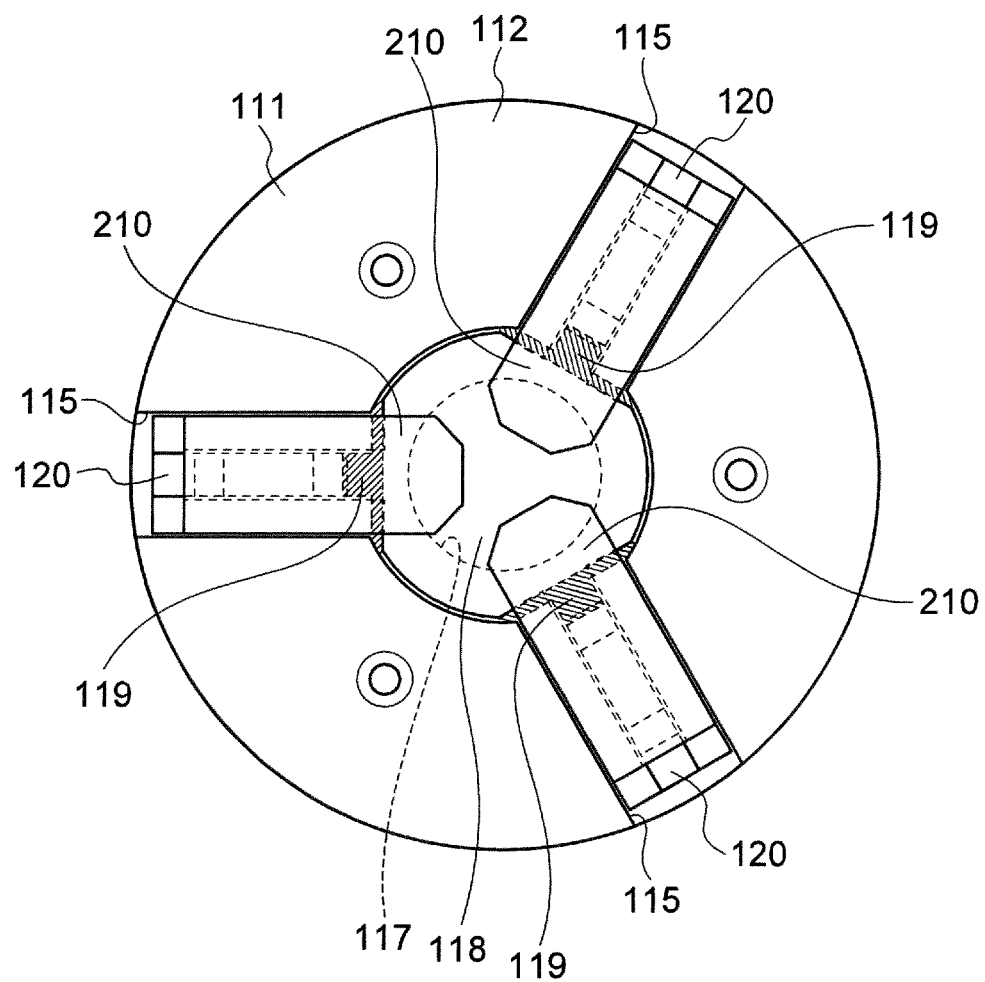
FIG. 13 is a diagram illustrating a state of the end face of the chuck main body when the chuck is closed in the conventional chuck mechanism.

FIG. 8 is a diagram illustrating a state of the end face 112 of the chuck main body 110 in a state in which the chuck is opened and FIG. 9 is a diagram illustrating a state of the end face 112 of the chuck main body 110 in a state in which the chuck is closed.

FIGS. 10A to 10D are diagrams illustrating a configuration of the top plate 310, FIG. 10A is a plan view (a diagram in which the end face 112 is viewed from the outside of the chuck main body 110 in the axial direction when the top plate is attached to the end face 112 of the chuck main body 110 and the same applies hereinafter), FIG. 10B is a side view when viewed from a direction A of FIG. 10A, FIG. 10C is a partially enlarged cross-sectional view taken along a line B-B of FIG. 10A, and FIG. 10D is a partially enlarged cross-sectional view taken along a line C-C of FIG. 10A. Furthermore, in order to help the understanding, in FIG. 10B, a configuration at the right side of the line D-D of FIG. 10A is not illustrated.

FIGS. 11A to 11C are diagrams illustrating a configuration of the top cover 360, FIG. 11A is a plan view, FIG. 11B is a front view when viewed from a direction E of FIG. 11A, and FIG. 11C is a side view when viewed from a direction F of FIG. 11A.

As illustrated in FIGS. 8 and 9, the top plate 310 and the top cover 360 are installed in the end face 112 of the chuck main body 110 to prevent the intrusion of chips into a gap formed between the chuck cover 117 (the chuck cover lid 118) installed in the chuck main body 110 and the end part (the end part on the inner diameter side of the end face 112 of the chuck main body 110) on the inner diameter side of the master jaw 120 and the stair form member attached jaw 200. As illustrated in the drawings, the end face 112 of the chuck main body 110 is provided with one top plate 310 and three top covers 360.

The top plate 310 is a plate-shaped member that has a substantially triangular shape in the plan view as illustrated in FIGS. 10A and 10B. A master jaw entrance notch 320 is formed at a center part of three longitudinal sides of the top plate 310. The master jaw entrance notch 320 is a notch which overlaps the center part of the master jaw insertion groove 115 of the chuck main body 110 as illustrated in FIGS. 8 and 9 when the top plate 310 is installed in the end face 112 of the chuck main body 110. That is, a width a of the master jaw entrance notch 320 is the same as the width of the master jaw insertion groove 115 and the center end part of the master jaw 120 moving along the master jaw insertion groove 115 in the radial direction can enter the master jaw entrance notch 320.

As a depth b of the master jaw entrance notch 320, a length in which the master jaw 120 and the top plate 310 do not interfere with each other is secured while the chuck is closed, that is, when the center end part of the master jaw 120 moves to be closest to the center side (a state of FIG. 9).

A top cover guide recess 330 is formed in the periphery of the master jaw entrance notch 320 of the top plate 310. As illustrated in FIGS. 10C and 10D, the top cover guide recess 330 is formed at the lower face side of the top plate 310 (at a position contacting the end face 112 of the chuck main body 110) and the top cover 360 to be described later is movable therein in a direction parallel to the movement direction of the master jaw 120 (the radial direction of the end face 112 of the chuck main body 110).

A width c of the top cover guide recess 330 is a length which is substantially the same as a gap to be blocked by the top cover set 300, that is, a width of a gap formed between the inner diameter side end part of the master jaw 120 and the chuck cover 117 (a length in a direction parallel to the longitudinal side of the top plate 310). Further, the width c of the top cover guide recess 330 is substantially the same as the width of the top cover 360 to be described later and is a length in which the top cover 360 is easily movable inside the top cover guide recess 330.

Further, as a depth d of the top cover guide recess 330, a length in which the center end part of the top cover 360 moving toward the center side to follow the master jaw 120 does not interfere with the top plate 310 is secured as will be described later while the chuck is closed, that is, when the center end part of the master jaw 120 moves closest to the center side (a state of FIG. 9).

As illustrated in FIGS. 11A to 11C, the top cover 360 is a plate-shaped member that has a substantially rectangular shape in the plan view. As illustrated in FIGS. 8 and 9, the top cover 360 is fitted into each of the top cover guide recesses 330 formed at three positions of the top plate 310 and is guided by the top cover guide recess 330 so that the end face 112 of the chuck main body 110 moves in the radial direction.

In the outer edge of the top cover 360, a master jaw serration face fitting part (first close contact part) 370 which is notched inward is formed at both sides of the edge and a grip contact part (second close contact part) 375 which protrudes outward is formed between the master jaw serration face fitting parts 370. Both master jaw serration face fitting parts 370 are parts (close contact parts) which are fitted to the center end part of the master jaw 120. Further, the grip contact part 375 is a part which is in contact with an end face 514 on the inner diameter side of the rear grip 510 inserted into the jaw installing groove 123 of the master jaw 120.

As described above, the serration faces 125 and 126 are formed at both sides of the master jaw 120 in the short direction (see FIG. 2). Further, the upper opening 127 of the jaw installing groove 123 is formed between one serration face 125 and the other serration face 126. Further, the serration faces 125 and 126 protrude to the front face side in relation to the end face 112 of the chuck main body 110. The top cover 360 is formed in a shape to be fittable to the center end part of the master jaw 120 with such a configuration. That is, as illustrated in FIG. 8, the serration faces 125 and 126 of the master jaw 120 are fitted to both master jaw serration face fitting parts 370 and the grip contact part 375 of the top cover 360 is fitted to the groove opening part 127 between the serration faces 125 and 126 of the master jaw 120.

When the stair form member attached jaw 200 is attached to the master jaw 120 as described above, the grips 510 and 540 which sandwich the stair form member 240 of the stair form member attached jaw 200 is disposed in the groove opening part 127 between the serration faces 125 and 126 of the master jaw 120. Thus, the end part of the grip contact part 375 is formed in a shape which is substantially the same as the shape of the end face 514 on the inner diameter side of the rear grip 510 (a flat face in the embodiment) and the grip contact part 375 is in contact with the end face 514 on the inner diameter side of the rear grip 510 while the rear grip 510 is inserted into the groove opening part 127 of the master jaw 120 in order to attach the stair form member attached jaw 200. Accordingly, the top cover 360 is in (close) contact with the master jaw 120 and the rear grip 510 at all positions of the outer edges of both master jaw serration face fitting parts 370 and the center grip contact part 375.

As illustrated in FIGS. 10A and 10D, a tap 332 is formed in a region of the top cover guide recess 330 of the top plate 310. The tap 332 is a screw hole which penetrates the top cover guide recess 330 from the front to the rear sides. The tap 332 is formed at each of three top cover guide recesses 330 of the top plate 310. The tap 332 is provided with a top cover fixing bolt 340 as illustrated in FIG. 10D. The top cover fixing bolt 340 is, for example, a hexagon socket set screw.

Further, as illustrated in FIGS. 11A to 11C, a front face of the top cover 360 is provided with a fixing bolt seat 380. The fixing bolt seat 380 is an oval recess part (a long seat grip) having a predetermined depth. The fixing bolt seat 380 is formed at a position to which the tap 332 of the top plate 310 is attached when the top cover 360 is fitted into the top cover guide recess 330 of the top plate 310. That is, a front end of the top cover fixing bolt 340 installed in the tap 332 of the top plate 310 is inserted into the fixing bolt seat 380 when the top cover 360 is attached to the top plate 310. Furthermore, in the normal state, the top cover fixing bolt 340 loosely engages with the fixing bolt seat 380 to a degree in which the top cover 360 is movable along the top cover guide recess 330 of the top plate 310 regardless of a state in which a bottom face of the fixing bolt seat 380 is pressed.

As described above, in the normal state, the top cover 360 is provided to be movable in the radial direction of the end face 112 of the chuck main body 110 along the top cover guide recess 330 of the top plate 310, but the top cover fixing bolt 340 is fastened when there is a need to fix the top cover 360. That is, the top cover fixing bolt 340 is fastened in a state in which the top cover fixing bolt 340 presses the bottom face of the fixing bolt seat 380 of the top cover 360. As a result, the top cover 360 is fixed so as not to be movable along the top cover guide recess 330 of the top plate 310 of the top cover 360 while being sandwiched between the top cover fixing bolt 340 and the end face 112 of the chuck main body 110.

Furthermore, a structure for fixing the top cover 360 by the tap 332, the top cover fixing bolt 340, and the fixing bolt seat 380 corresponds to the "chip/dust prevention cover fixing member" of claims.

Further, as illustrated in FIGS. 10A to 10D, a rear face of the faces forming the top cover guide recess 330 of the top plate 310 is provided with a spring seat 335 provided with an end part of a spring. Further, as illustrated in FIGS. 11A to 11C, a spring seat (force receiving part) 385 is formed at a center part of the end face at the center side of the top cover 360, that is, a face facing the spring seat 335 of the top plate 310 when the top cover 360 is installed in the top cover guide recess 330 of the top plate 310.

In order to attach the top cover 360 to the top cover guide recess 330 of the top plate 310, a spring 390 (an urging member) which urges the top plate 310 and the top cover 360 in a separation direction is disposed between the spring seat 335 installed in the top plate 310 and the spring seat 385 installed in the top cover 360 as illustrated in FIGS. 8 and 9. Accordingly, an outward force, that is, a force directed toward the master jaw 120 is normally applied to the top cover 360 so that the top cover 360 is kept to be pressed against the master jaw 120.

Furthermore, the top plate 310 is installed in the end face 112 of the chuck main body 110 as illustrated in FIGS. 8 and 9 in such a manner that an attachment bolt (not illustrated) is inserted into a bolt hole 339.

Further, the top plate 310 and the top cover 360 are installed in the end face 112 of the chuck main body 110 before the stair form member attached jaw 200 is installed in the master jaw 120 while the master jaw 120 is installed in the chuck main body 110.

Also in the chuck mechanism 10 with such a configuration, in order to cut the workpiece by the lathe 1, as illustrated in FIG. 8, the master jaw 120 and the soft jaw 210 attached thereto are moved outward in the radial direction of the end face 112 of the chuck main body 110 so that the chuck is opened and the workpiece is fitted to the center part of the end face of the opened chuck main body 110. At this time, the top cover 360 which is urged toward the outer periphery by the spring 390 is pressed against the master jaw 120 to be fitted to the end face at the center side of the master jaw 120. That is, both master jaw serration face fitting parts 370 of the top cover 360 are fitted to the end parts of the serration faces 125 and 126 at the center side of the master jaw 120 in a contact state and the grip contact part 375 of the top cover 360 is fitted to the end face at the center side of the stair form member 240 of the stair form member attached jaw 200 attached to the master jaw 120 in a contact state.

Further, the periphery of the top cover 360 is covered by the top plate 310 and a gap between the end face at the center side of the master jaw 120 in the radial direction and the outer diameter part of the chuck cover 117 (the chuck cover lid 118) is not exposed to the end face 112 of the chuck main body 110. That is, in the chuck mechanism 10 of the embodiment, even when the master jaw 120 and the stair form member attached jaw 200 are retracted to the outer peripheral side of the end face 112 of the chuck main body 110 so that the chuck is opened, a gap into which chips intrude is not formed at the center side of the master jaw 120.

Further, when the workpiece is disposed, the master jaw 120 and the stair form member attached jaw 200 are moved inward in the radial direction so that the chuck is closed as illustrated in FIG. 9 and the workpiece is gripped by three soft jaws 210. Also at this time, the top cover 360 moves to the center side in accordance with the movement of the master jaw 120. However, even at this time, a gap into which chips intrude is not formed at the center side of the master jaw 120. That is, a gap between the end face at the center side of the master jaw 120 in the radial direction and the outer diameter part of the chuck cover 117 (the chuck cover lid 118) is not exposed to the end face 112 of the chuck main body 110.

In this way, according to the chuck mechanism 10 of the embodiment, since it is possible to appropriately prevent chips from adhering or accumulating on the soft jaw 210, the master jaw 120, the master jaw insertion groove 115, or the chuck main body 110, it is possible to remove the risk of a chucking failure and deterioration in gripping accuracy (clamping accuracy). As a result, it is possible to efficiently perform a desired cutting process with high accuracy. Further, accordingly, since it is possible to perform an automated operation, an unattended operation, a maintenance-free operation, or the like of a machine tool such as a lathe, it is possible to achieve improvement of productivity and machine operation rate.

Second Embodiment

Another embodiment of the top cover set (chip/dust prevention cover set) 300 which is a second embodiment of the invention will be described with reference to FIGS. 14 to 16.

When an automated operation or an unattended operation of a machine tool such as a lathe is performed, it is desirable to perform an air blow for washing on the serration face of the master jaw or the engagement serration face (hereinafter, simply referred to as the serration face 125 of the master jaw) of the master jaw and the soft jaw. A top cover set which is the second embodiment is a top cover set capable of performing an air blow on the serration face of the master jaw.

Similarly to the top cover set 300 of the first embodiment, the top cover set of the second embodiment also includes one top plate 610 and three top covers (chip/dust prevention covers) 660 and is applied to the lathe 1 which is the same as that of the first embodiment. Here, it is assumed that the chuck main body 110 adopting the top cover set of the second embodiment is provided with a spindle inner pipe 114 (see FIG. 14B) in which air is sent to the axial center part.

A configuration other than the top plate 610, the top cover 660, and the spindle inner pipe 114, that is, a configuration of the chuck mechanism 10, the lathe 1, or the master jaw 120 is the same as that of the first embodiment. Thus, a configuration other than the top plate 610 and the top cover 660 will be omitted in the description below and the same reference numeral as that of the first embodiment is used for reference.

Figure 14A:
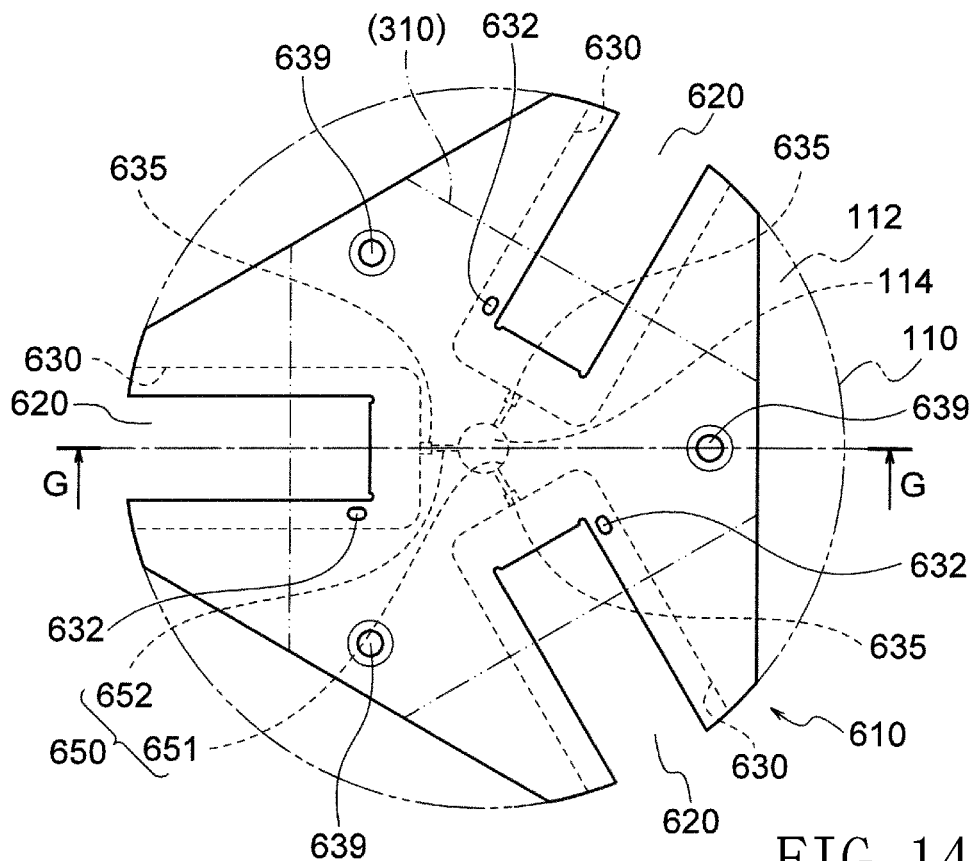
FIGS. 14A and 14B are diagrams illustrating a configuration of a top plate according to a second embodiment of the invention.
Figure 14B:
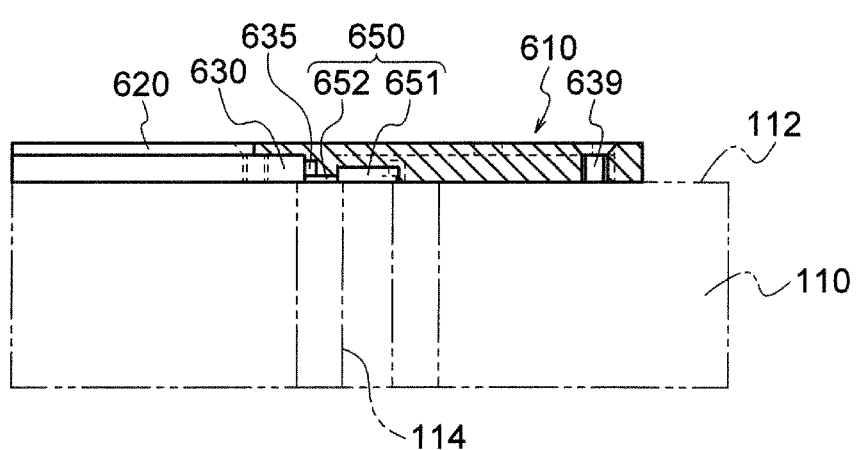

FIGS. 14A and 14B are diagrams illustrating a configuration of the top plate 610, FIG. 14A is a plan view, and FIG. 14B is a cross-sectional view taken along a line G-G of FIG. 14A.

In FIG. 14A, the top plate 310 of the first embodiment is indicated by a two-dotted chain line so as to clarify a difference between the top plate 610 of the second embodiment and the top plate 310 of the first embodiment. As illustrated in FIG. 14A, the second top plate 610 of the second embodiment has a configuration in which the master jaw entrance notch 320 and the top cover guide recess 330 of the top plate 310 of the first embodiment are enlarged to the outer periphery of the end face 112 of the chuck main body 110.

That is, the top plate 610 of the second embodiment is a plate-shaped member that is further larger than the top plate 310 of the first embodiment and has a substantially triangular shape in the plan view to cover most of the end face 112 of the chuck main body 110. The structure of a master jaw entrance notch 620 and a top cover guide recess 630 is the same as the master jaw entrance notch 320 and the top cover guide recess 330 of the first embodiment except that the depths b and d (see FIGS. 10A to 10D) are long. For the functions of the master jaw entrance notch 620 and the top cover guide recess 630, only the inserted top plate is different. Then, basic functions are the same as those of the master jaw entrance notch 320 and the top cover guide recess 330 of the first embodiment.

Further, a rear face of the faces forming the top cover guide recess 630 of the top plate 610 is provided with a spring seat (spring hole) 635 provided with an end part of a spring similarly to the spring seat 335 of the first embodiment. Further, a region of the top cover guide recess 630 of the top plate 610 is provided with a tap 632 of which a structure and a function are the same as those of the tap 332 of the first embodiment.

As illustrated in FIGS. 14A and 14B, the lower face of the center part of the top plate 610 (the face contacting the end face 112 of the chuck main body 110) of the second embodiment is provided with a top plate air groove 650 including a center circular hole 651 and three spring hole connection grooves 652. The center circular hole 651 is a recess part which receives air sent through the spindle inner pipe 114 of the chuck main body 110 and the spring hole connection groove 652 is a groove which connects the center circular hole 651 and three spring holes (spring seat) 635. By the top plate air groove 650 with such a structure, air sent through the spindle inner pipe 114 of the chuck main body 110 is sent to the top cover guide recess 630 through the center circular hole 651, the spring hole connection groove 652, and the spring hole (the spring seat) 635.

Figure 15A:
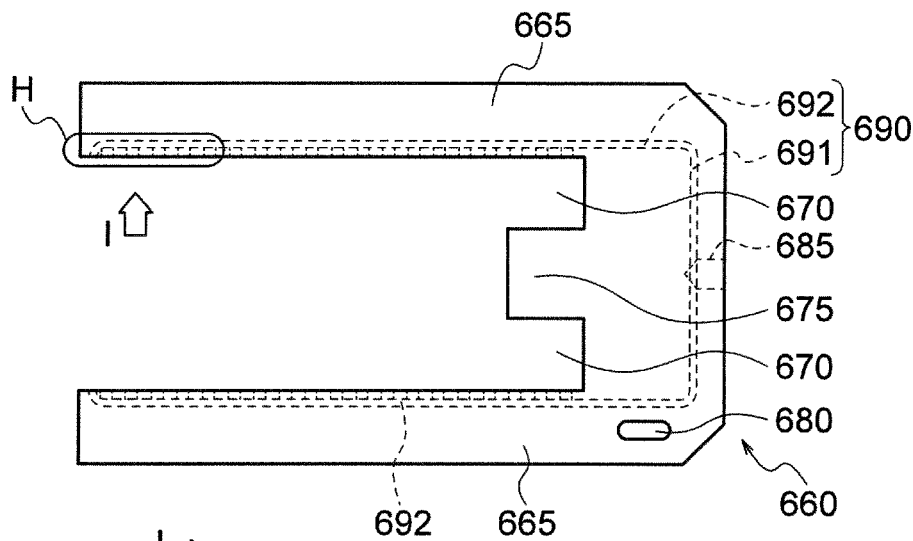
FIGS. 15A to 15E are diagrams illustrating a configuration of a top cover (chip/dust prevention cover) according to a second embodiment of the invention.
Figure 15B:
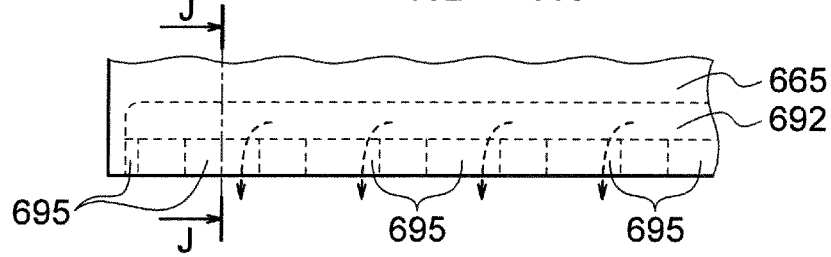
Figure 15C:
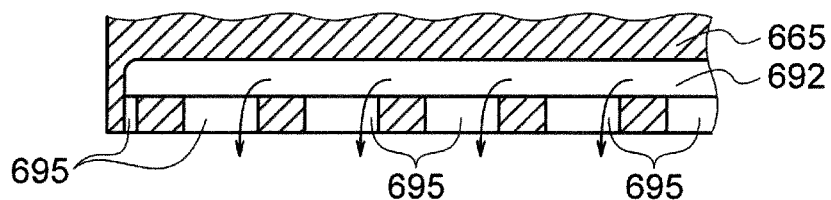
Figure 15D:
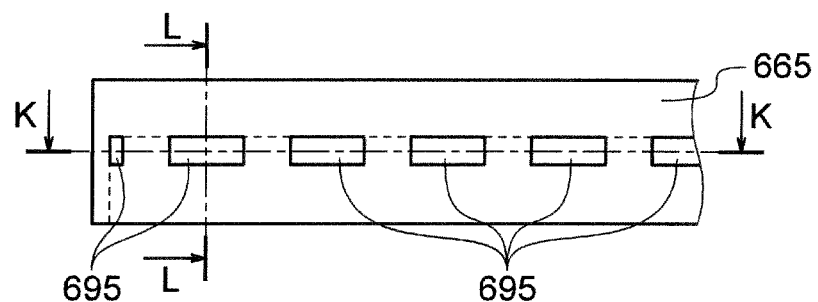
Figure 15E:
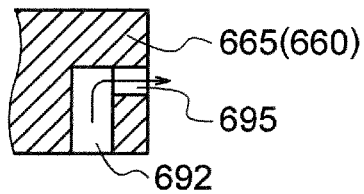

FIGS. 15A to 15E are diagrams illustrating a configuration of the top cover 660, FIG. 15A is an overall plan view, FIG. 15B is an enlarged view (a partially plan view) of a part H of FIG. 15A, FIG. 15C is a cross-sectional view at the same position as that of FIG. 15B (a cross-sectional view taken along a line L-L of FIG. 15C), FIG. 15D is a side view in which a part H of FIG. 15A is viewed from a direction I of FIG. 15A, and FIG. 15E is a cross-sectional view illustrating a part H of FIG. 15A when taken along a line J-J of FIG. 15B and a line L-L of FIG. 15D.

As illustrated in FIG. 15A, the top cover 660 of the second embodiment is a plate-shaped member that has a substantially rectangular shape in the plan view similarly to the top cover 360 of the first embodiment. The top cover 660 is fitted to each of three top cover guide recesses 630 of the top plate 610 (see FIG. 14A) and is guided by the top cover guide recess 630 so that the end face 112 of the chuck main body 110 moves in the radial direction.

The top cover 660 includes a master jaw serration face fitting part 670 and a grip contact part 675. The structures and the functions of the master jaw serration face fitting part 670 and the grip contact part 675 are the same as those of the master jaw serration face fitting part 370 and the grip contact part 375 of the top cover 360 of the first embodiment. That is, the master jaw serration face fitting part 670 is fitted to the serration faces 125 and 126 (see FIGS. 8 and 9 and the same applies hereinafter) of the master jaw 120 and the grip contact part 675 contacts the end face 514 on the inner diameter side of the rear grip 510. Accordingly, the top cover 660 is in (close) contact with the master jaw 120 and the rear grip 510 at all positions of the outer edge including the master jaw serration face fitting part 670 and the center grip contact part 675.

Further, a front face of the top cover 660 is provided with a fixing bolt seat 680. Further, a spring hole (spring seat) 685 is formed at the center part of the end face at the center side of the top cover 660, that is, a face facing the spring hole (spring seat) 635 of the top plate 610 when the top cover 660 is installed in the top cover guide recess 630 of the top plate 610. The structures and the functions of the fixing bolt seat 680 and the spring hole (spring seat) 685 are basically the same as those of the fixing bolt seat 380 and the spring seat 385 of the top cover 360 of the first embodiment.

The top cover 660 of the second embodiment is largely different from the top cover 360 of the first embodiment in the following two points. The first point is a point that outer parts of two master jaw serration face fitting parts 670 are largely stretched along the direction of the master jaw serration face fitting part 670 and are formed at a master jaw side extension part 665. The second point is that a structure for blowing air to a serration face of a master jaw including an air outlet 695 formed at the master jaw side extension part 665 is provided.

Regarding the first difference, a shape of an outer part of the master jaw serration face fitting part 370 of the top cover 360 of the first embodiment is indicated by a two-dotted chain line in FIG. 15A. As illustrated in FIG. 15A, both outer parts of the master jaw serration face fitting part 670 of the top cover 660 of the second embodiment are stretched along the arrangement direction of the master jaw 120. When the top cover 660 is fitted to the master jaw 120, the master jaw side extension part 665 is disposed in the entire region of the side parts of the serration faces 125 and 126 of the master jaw 120 as illustrated in FIG. 16A.

Regarding the second difference, the top cover 660 of the second embodiment includes the air outlet 695 and a top cover air groove (chip/dust prevention cover air groove) 690 which includes a connection groove 691 and an extension part air groove 692 as a structure for blowing air to the serration face of the master jaw. The connection groove 691 is a groove which connects the spring hole (spring seat) 685 to the end part of the extension part air groove 692. The extension part air groove 692 is a groove which is formed along the inside of the master jaw side extension part 665 (the side close to the serration faces 125 and 126 of the master jaw 120 (see FIGS. 16A to 16D)).

Then, the air outlet 695 is an opening part for blowing air flowing to the extension part air groove 692 to the serration face of the master jaw as illustrated in FIGS. 15B, 15C, and 15E. As illustrated in FIG. 15D, the air outlet 695 has a structure in which the extension part air groove 692 communicates with the inner end face of the master jaw side extension part 665 so that an opening is formed at the inner end face of the master jaw side extension part 665 as illustrated in FIGS. 15B and 15C and is arranged at a predetermined interval along the extension direction of the master jaw side extension part 665.

A method of performing an air blow to the serration face of the master jaw by the top cover set (top plate 610 and the top cover 660) of the second embodiment with such a configuration will be described with reference to FIGS. 16A to 16D.

FIGS. 16A to 16D are schematic diagrams illustrating a state in which the top plate 610, the top cover 660, and the master jaw 120 according to the second embodiment are installed in the chuck main body 110 and illustrates only one position among three positions, FIG. 16A is a plan view, FIG. 16B is a cross-sectional view of a part M of FIG. 16A (cross-sectional view taken along a line R-R of FIG. 16C), FIG. 16C is a side view in which a part M of FIG. 16A is viewed from a direction N of FIG. 16A, and FIG. 16D is a cross-sectional view of a part M of FIG. 16A when taken along a line P-P of FIG. 16B and a line Q-Q of FIG. 16C.

As illustrated in FIG. 16A, in the lathe provided with the top plate 610, air sent through the spindle inner pipe 114 flows through the center circular hole 651, the spring hole connection groove 652, and the spring hole (spring seat) 635 of the top plate 610 and is sent to the top cover guide recess 630. Air sent to the top cover guide recess 630 of the top plate 610 flows to the connection groove 691 and the extension part air groove 692 of the top cover 660 through the spring hole (spring seat) 685 of the top cover 660 and is blown from the air outlet 695 formed in the extension part air groove 692 toward the serration faces 125 and 126 of the soft jaw and the master jaw 120 as illustrated in FIG. 16B.

At this time, the positional relationship of the air outlet 695, the master jaw 120, and the serration faces 125 and 126 of the soft jaw is set to a positional relationship that air blown out from the air outlet 695 is blown to a gap (groove) between the gears of the serration faces 125 and 126 of the master jaw 120 as illustrated in FIGS. 16C and 16D. Thus, air is appropriately blown to the serration faces 125 and 126 of the master jaw 120. As a result, even when chips or trash exist in the groove of the serration, chips or the like can be blown away to be removed.

In this way, since it is possible to appropriately prevent chips from adhering or accumulating on the soft jaw, the master jaw, the master jaw insertion groove, or the chuck main body in the lathe 1 or the like even when the top plate 610 and the top cover 660 of the second embodiment are used, it is possible to remove the risk of a chucking failure, deterioration in gripping accuracy (clamping accuracy), and the like. Particularly when the top plate 610 and the top cover 660 of the second embodiment are used, it is possible to appropriately prevent chips from intruding into the serration face of the master jaw at the time of replacing the workpiece or replacing the soft jaw. As a result, particularly, since it is possible to perform an automated operation, an unattended operation, a maintenance-free operation, or the like of a machine tool such as a lathe, it is possible to perform a desired cutting process with high precision and efficiency by the automated operation and to achieve improvement of productivity and machine operation rate.

Furthermore, when the top cover set of the second embodiment is used, a sheet-shaped member may be installed between the top plate 610 and the end face 112 of the chuck main body 110 in order to prevent the leakage of air. The sheet-shaped member is a member that has substantially the same outer shape as that of the top plate 610 and is notched at a position corresponding to the bolt hole 639, the top cover guide recess 630, and the center circular hole 651 of the top plate air groove 650 of the lower face of the top plate 610. In some cases, a part of the spring hole connection groove 652 of the top plate air groove 650 may be further notched.

As the material of the sheet-shaped member, an arbitrary material may be used as long as the material can seal a gap between the end face 112 of the chuck main body 110 and the lower face of the top plate 610. For example, any material such as resin like rubber, metal, and ceramic may be used, but preferably, a material usually used as a packing, a gasket, or the like is appropriate.

When such a sheet-shaped member is installed, it is possible to prevent a problem in which air flows to a position other than the above-described intended passage, that is, air leakage as the second embodiment. Accordingly, it is possible to further improve the operational effects of the top cover set of the second embodiment that removes chips or the like by blowing air thereto.

Furthermore, such a sheet-shaped member is also one of the invention and the top cover set (chip/dust cover set) including the sheet-shaped member is also within the scope of the invention.

Modified Example

Furthermore, the invention is not limited to the above-described embodiments and can be arbitrarily modified into various appropriate forms.

Figure 17:
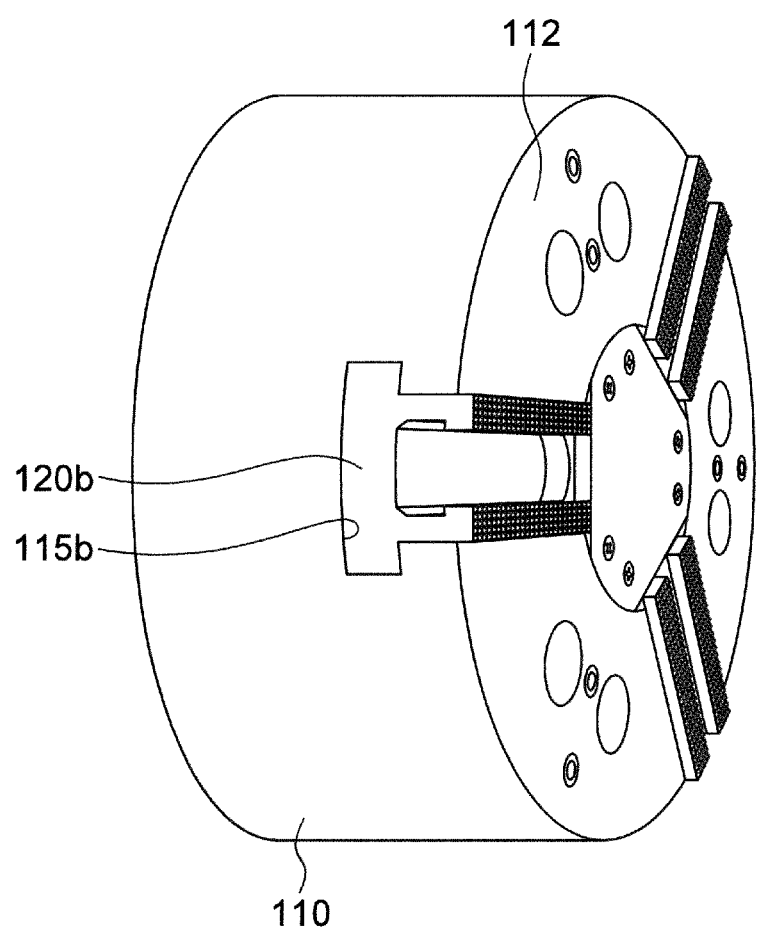
FIG. 17 is a diagram illustrating another configuration of the master jaw and the chuck main body of the chuck mechanism according to the invention.

For example, in the above-described embodiments, the master jaw is the master jaw 120 having a cross-sectional shape in which the wide bottom part and the narrow upper part are connected in two stages (see FIG. 2) and the groove 115 of the chuck main body 110 to which the master jaw is fitted also has a cross-sectional shape in which the wide bottom part and the narrow upper part are connected in two stages similarly to the cross-sectional shape of the master jaw 120. However, the structure of the master jaw insertion groove of the chuck main body and the master jaw is not limited thereto. For example, as illustrated in FIG. 17, the master jaw may be a master jaw 120b having a cross-sectional shape in which the wide bottom part and the narrow upper part are provided in only one stage. In this case, the groove of the chuck main body 110 also becomes a master jaw insertion groove 115b having a cross-sectional shape in which the wide bottom part and the narrow upper part are provided in only one stage similarly to the cross-sectional shape of the master jaw 120. In this way, since the cross-sectional shapes of the master jaw and the master jaw insertion groove of the chuck main body to which the master jaw is fitted are simplified, it is easy to perform an operation of attaching the master jaw to the chuck main body. The master jaw and the master jaw insertion groove of the chuck main body may have such a configuration.

Further, in the above-described embodiments, the stair form member attached jaw 200 has a configuration in which the stair form member attached jaw main body 201 and the serration pieces 271 and 272 are assembled and integrated by the serration piece attachment bolt 280 (see FIGS. 3A to 3C). However, a connection structure of the stair form member attached jaw main body, the transverse serration piece, and the longitudinal serration piece is not limited thereto. For example, as illustrated in FIGS. 18A to 18C, these members may be connected by two knock pins 282.

Figure 18A:
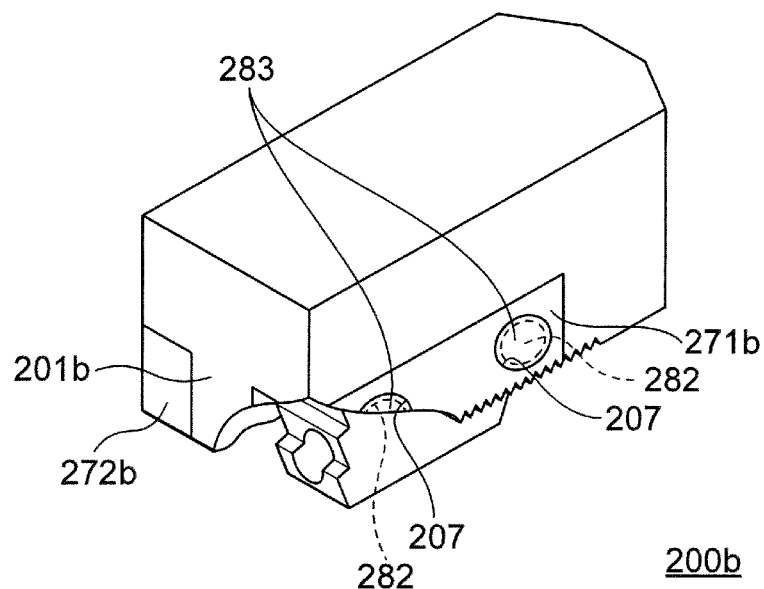
FIGS. 18A to 18C are diagrams illustrating another configuration of the stair form member attached jaw of the chuck mechanism according to the invention.
Figures 18B, 18C:
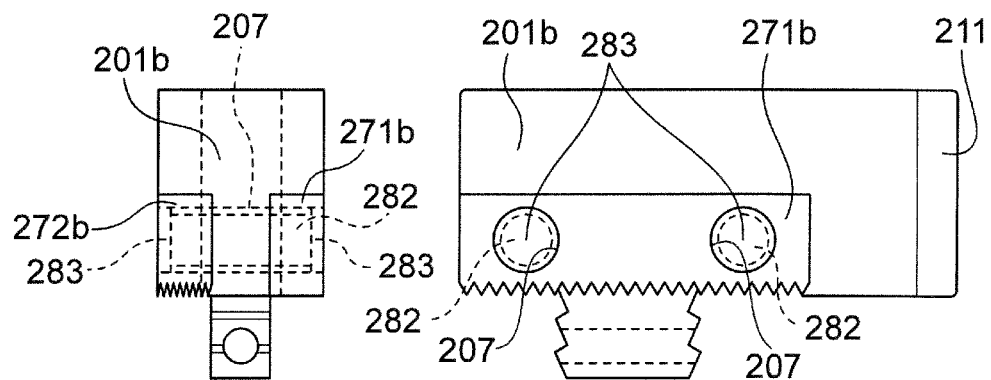

In a stair form member attached jaw 200b illustrated in FIGS. 18A to 18C, a transverse serration piece 271b and a longitudinal serration piece 272b are respectively disposed at the serration piece notches 203 and 204 (see FIGS. 4A to 4C) of the stair form member attached jaw main body 201b, the knock pin 282 is inserted into the knock pin passage hole 207 formed to penetrate the serration pieces 271b and 272b and the stair form member attached jaw main body 201b, and both end faces 283 of the knock pin 282 are welded to the serration pieces 271b and 272b, so that the stair form member attached jaw 200b substantially having the same configuration as that of the stair form member attached jaw 200 described with reference to FIGS. 3A to 3C is formed.

In this way, when the serration pieces 271b and 272b are installed in the stair form member attached jaw main body 201b by welding the knock pin 282, a positional deviation of the serration piece due to the looseness of the bolt can be prevented and hence the serration piece can be more strongly installed in the stair form member attached jaw main body.

Furthermore, the number of the knock pins or the bolts connecting the serration piece and the stair form member attached jaw main body is set to three in the stair form member attached jaw in FIGS. 3A to 3C and is set to two in the stair form member attached jaw illustrated in FIGS. 18A to 18C, but the invention is not limited thereto. That is, an arbitrary number of bolts or knock pins may be used. Preferably, the number of bolts or the like is set to an appropriate number in response to the required strength, the size of the stair form member attached jaw, or the like.

Further, in the above-described embodiment, as a method of installing the stair form member attached jaw 200 in the master jaw 120 by the rear grip 510 and the front grip 540, as illustrated in FIGS. 7A to 7C, the grips 510 and 540 are first inserted into the jaw installing groove 123 of the master jaw 120 (FIG. 7A). Subsequently, the stair form member attached jaw 200 is moved from the upper side of the jaw installing groove 123 of the master jaw 120 toward the jaw installing groove 123 of the master jaw 120 and the stair form member 240 is inserted into the jaw installing groove 123 (FIG. 7B). Finally, the clamping bolt 570 is inserted and fastened. However, a method of installing the stair form member attached jaw 200 in the master jaw 120 is not also limited thereto. For example, as illustrated in FIGS. 19A to 19C, a method of first connecting the stair form member attached jaw 200, the rear grip 510, and the front grip 540 by the clamping bolt 570 may be used.

Figure 19A:
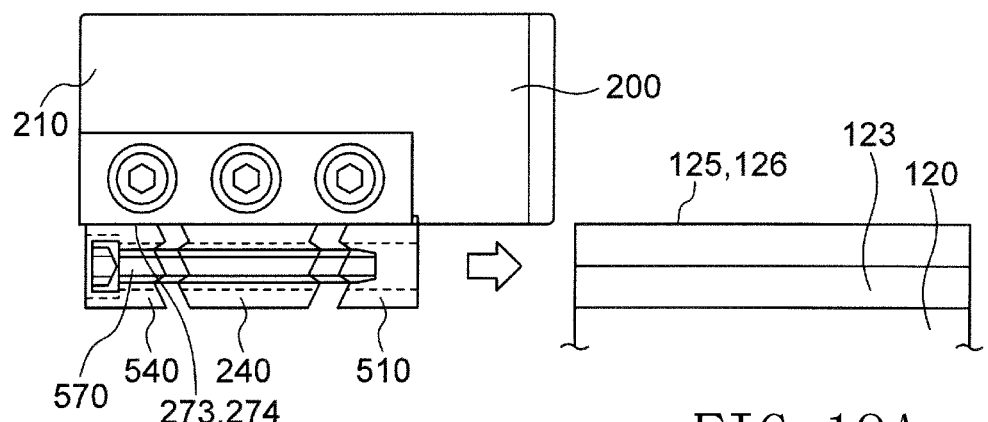
FIGS. 19A to 19C are diagrams illustrating another procedure of installing the stair form member attached jaw illustrated in FIGS. 3A to 3C in the master jaw illustrated in FIG. 2.
Figure 19B:
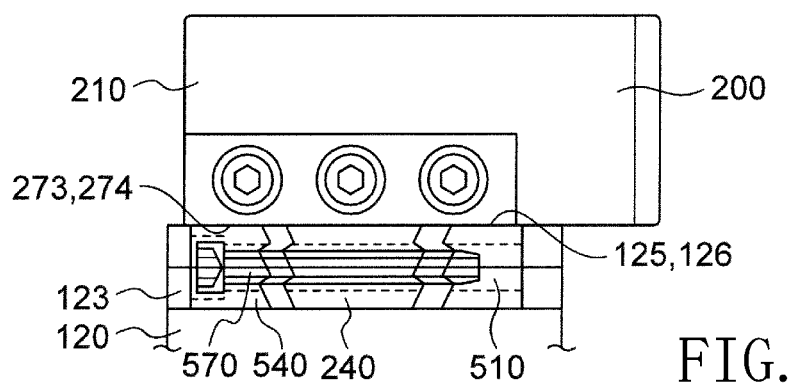
Figure 19C:
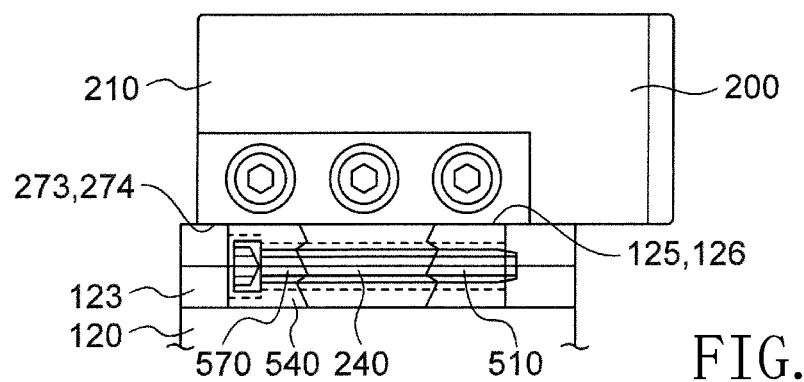

That is, in the method illustrated in FIGS. 19A to 19C, the stair form member attached jaw 200, the rear grip 510, and the front grip 540 are connected by the clamping bolt 570 at the outside before the rear grip 510 and the front grip 540 are installed in the jaw installing groove 123 of the master jaw 120 (FIG. 19A). Next, the stair form member attached jaw 200, the rear grip 510, and the front grip 540 connected by the clamping bolt 570 are fitted to the jaw installing groove 123 of the master jaw 120 installed in the chuck main body 110 from the outer peripheral side of the chuck main body 110 and the stair form member attached jaw 200 is disposed at a predetermined position on the master jaw 120 (FIG. 19B).

At this time, there is no need to fasten the clamping bolt 570. When fitting the stair form member attached jaw 200 or the like to the jaw installing groove 123 of the master jaw 120, there is a need to move the stair form member attached jaw 200 along the jaw installing groove 123 of the master jaw 120 in a state in which the serration faces 273 and 274 formed on the lower face of the soft jaw 210 of the stair form member attached jaw 200 do not interfere with the serration faces 125 and 126 formed on the upper face of the master jaw 120. For that reason, the clamping bolt 570 is loosened in a state in which the stair form member attached jaw 200 is movable in the vertical direction (depth direction of the jaw installing groove 123 of the master jaw 120) and the stair form member attached jaw 200 is sufficiently raised upward.

When the rear grip 510 and the front grip 540 are inserted into the jaw installing groove 123 of the master jaw 120 installed in the chuck main body 110, the clamping bolt 570 is fastened. As a result, similarly to the above-described embodiment described with reference to FIGS. 7A to 7C, the stair form member attached jaw 200 is pulled downward with respect to the grips 510 and 540 and the serrations of the serration faces 273 and 274 of the stair form member attached jaw 200 deeply engage with the serrations of the serration faces 125 and 126 of the master jaw 120 so that the soft jaw 210 of the stair form member attached jaw 200 is positioned with high precision.

In such a method, since the stair form member attached jaw 200 is connected to the rear grip 510 and the front grip 540 from the beginning when the stair form member attached jaw 200 is installed in the master jaw 120, the stair form member attached jaw 200 does not come off during the attachment operation and hence is more efficiently and stably installed in the stair form member attached jaw 200.

Further, in the above-described embodiments, since the top cover fixing bolts 340 of the top plates 310 and 610 loosely engage with the fixing bolt seats 380 and 680 of the top covers 360 and 660, the top covers 360 and 660 can be moved. Then, since the top cover fixing bolt 340 is threaded if necessary, the top covers 360 and 660 can be fixed. However, it is rare to remove the master jaw 120 from the chuck main body 110. Particularly when there is no need to fix the top covers 360 and 660, a configuration in which the top cover fixing bolts 340 of the top plates 310 and 610 loosely engage with the fixing bolt seats 380 and 680 of the top covers 360 and 660 (chip/dust prevention cover fixing member) may be removed. Even without this configuration, an object of the invention that prevents chips from intruding into the chuck mechanism can be achieved without any influence.

Further, in the above-described embodiments, the spring is disposed as the urging member that urges the top plates 310 and 610 and the top covers 360 and 660 in a separation direction. However, the spring is not limited to a so-called coil spring, but may be a leaf spring or the like. That is, an arbitrary configuration may be used as long as the member can urge the top covers 360 and 660 in the separation direction from the top plates 310 and 610.

Further, in the above-described embodiment, the stair form member attached jaw (200, 200b) has a configuration in which the transverse serration piece (271, 271b) and the longitudinal serration piece (272, 272b) are attached to the stair form member attached jaw main body (201, 201b) in which the jaw main body (202) and the stair form member (240) are integrated with each other. However, a configuration in which the serration (273, 274) is attached to the integral soft jaw (210) along with the stair form member (240) may be also used.

Further, in the above-described embodiments, an example in which the invention is applied to the lathe has been described, but the machine tool according to the invention is not limited to the lathe. For example, the invention can be applied to an arbitrary machine tool such as a milling machine and a machining center that processes a workpiece while fixing the workpiece to the chuck mechanism.

EXPLANATIONS OF LETTERS OR NUMERALS

1 LATHE (MACHINE TOOL)
10 CHUCK MECHANISM
110 CHUCK MAIN BODY
120, 120b MASTER JAW
200, 200b STAIR FORM MEMBER ATTACHED JAW
201, 201b STAIR FORM MEMBER ATTACHED JAW MAIN BODY
210 SOFT JAW
240 STAIR FORM MEMBER
300 TOP COVER SET (CHIP/DUST PREVENTION COVER SET)
310, 610 TOP PLATE
320, 620 MASTER JAW ENTRANCE NOTCH
330, 630 TOP COVER GUIDE RECESS
332, 632 TAP (CHIP/DUST PREVENTION COVER FIXING MEMBER)
335, 635 SPRING SEAT (SPRING HOLE)
339, 639 BOLT HOLE
340 TOP COVER FIXING BOLT (CHIP/DUST PREVENTION COVER FIXING MEMBER)
650 TOP PLATE AIR GROOVE
651 CENTER CIRCULAR HOLE
652 SPRING HOLE CONNECTION GROOVE
360, 660 TOP COVER (CHIP/DUST PREVENTION COVER)
665 MASTER JAW SIDE EXTENSION PART
370, 670 MASTER JAW SERRATION FACE FITTING PART (FIRST CLOSE CONTACT PART)
375, 675 GRIP CONTACT PART (SECOND CLOSE CONTACT PART)
380, 680 FIXING BOLT SEAT (CHIP/DUST PREVENTION COVER FIXING MEMBER)
385, 685 SPRING SEAT (SPRING HOLE)
390 SPRING
690 TOP COVER AIR GROOVE (CHIP/DUST PREVENTION COVER AIR GROOVE)
691 CONNECTION GROOVE
692 EXTENSION PART AIR GROOVE
695 AIR OUTLET
510, 540 GRIP

The invention claimed is:

1. A chip/dust prevention cover installed in a chuck end face of a chuck mechanism for gripping a workpiece to be processed, the chuck mechanism including a plurality of master jaws disposed radially in the chuck end face, and a movement member as an arbitrary member installed in and/or integrated with the master jaws and movable in a radial direction with the master jaws, the chip/dust prevention cover comprising:
   a plate face part which covers a predetermined region at a center of the chuck end face, the predetermined region including a radially inner side of the plurality of master jaws;
   a close contact part fitted to a center end part of the master jaw, the close contact part being in a close contact state with the movement member;
   a force receiving part for receiving an urging force which maintains the close contact state between the close contact part and the movement member, the force receiving part being formed at a center of the plate face part end face;
   master jaw side extension parts formed to extend from the plate face part along both sides of the master jaws in a radial direction;
   two series of air outlets which are formed in the master jaw side extension parts at the both sides of the master jaws and which blow an air flow to a serration face of the master jaws; and
   a chip/dust prevention cover air groove which supplies an air flow to the air outlets.

2. The chip/dust prevention cover according to claim 1, wherein the close contact part includes a first close contact part which is in close contact with the center side of a serration face part of the master jaw.

3. The chip/dust prevention cover according to claim 2, wherein the close contact part includes a second close contact part which is in close contact with a part other than a serration face part of the master jaw of the movement member.

4. A chuck end face plate installed in a chuck end face of a chuck mechanism for gripping a workpiece to be processed, comprising:
   a chip/dust prevention cover installation guide part to which the chip/dust prevention cover according to claim 1 is attachable so as to be movable in a radial direction of the chuck end face;
   an urging member that applies an urging force to the chip/dust prevention cover attached to the chip/dust prevention cover installation guide part; and
   a top plate air groove which supplies an air flow supplied through a pipe installed in a chuck main body to the chip/dust prevention cover air groove of the chip/dust prevention cover.

5. A chip/dust prevention cover set comprising:
   the chip/dust prevention cover according to claim 1; and
   a chuck end face plate which is installed in a chuck end face of a chuck mechanism for gripping a workpiece to be processed,
   wherein the chuck end face plate includes:
   a chip/dust prevention cover installation guide part to which the chip/dust prevention cover is attached so as to be movable in a radial direction of the chuck end face, an urging member that applies an urging force to the chip/dust prevention cover attached to the chip/dust prevention cover installation guide part, and a top plate air groove which supplies an air flow supplied through a pipe installed in a chuck main body to the chip/dust prevention cover air groove of the chip/dust prevention cover.

6. The chip/dust prevention cover set according to claim 5, further comprising:

the chip/dust prevention covers which are provided for the master jaws disposed radially; and the chuck end face plate which includes the chip/dust prevention cover installation guide parts for the chip/dust prevention covers and the urging members for the chip/dust prevention covers.

7. The chip/dust prevention cover set according to claim 5, further comprising:

a chip/dust prevention cover fixing member that includes the chip/dust prevention cover installation guide part of the chuck end face plate and the chip/dust prevention cover and defines a movement range of the chip/dust prevention cover.

8. A chuck mechanism comprising:
the chip/dust prevention cover set according to claim 5.

9. A machine tool comprising:
the chuck mechanism according to claim 8.

* * * * *